United States Patent
Koyama et al.

(10) Patent No.: US 10,781,330 B2
(45) Date of Patent: Sep. 22, 2020

(54) INK COMPOSITION, METHOD FOR PRODUCING THE SAME, AND IMAGE-FORMING METHOD

(71) Applicant: FUJIFILM CORPORATION, Minato-ku, Tokyo (JP)

(72) Inventors: Ichiro Koyama, Kanagawa (JP); Noriaki Sato, Kanagawa (JP); Shota Suzuki, Kanagawa (JP)

(73) Assignee: FUJIFILM CORPORATION, Tokyo (JP)

(*) Notice: Subject to any disclaimer, the term of this patent is extended or adjusted under 35 U.S.C. 154(b) by 0 days.

(21) Appl. No.: 16/587,060

(22) Filed: Sep. 30, 2019

(65) Prior Publication Data

US 2020/0024468 A1  Jan. 23, 2020

Related U.S. Application Data

(63) Continuation of application No. PCT/JP2018/012226, filed on Mar. 26, 2018.

(30) Foreign Application Priority Data

Apr. 3, 2017 (JP) ................. 2017-074056

(51) Int. Cl.
  *B41J 11/00* (2006.01)
  *C09D 11/10* (2014.01)
  *C09D 11/38* (2014.01)
  *B41M 5/00* (2006.01)
  *C09D 11/101* (2014.01)
  *C09D 11/102* (2014.01)

(52) U.S. Cl.
  CPC ............ *C09D 11/38* (2013.01); *B41J 11/002* (2013.01); *B41M 5/0023* (2013.01); *C09D 11/101* (2013.01); *C09D 11/102* (2013.01)

(58) Field of Classification Search
  CPC . B41J 2/2107; B41J 2/2146; B41J 2/01; B41J 11/002; B41J 2/21; B41J 2/5052; C09D 11/40; C09D 11/322; C09D 11/30; C09D 11/101; B41M 1/18; B41M 1/20; B41M 5/5218; B41M 5/00
  See application file for complete search history.

(56) References Cited

U.S. PATENT DOCUMENTS

| | | |
|---|---|---|
| 2010/0075115 A1 | 3/2010 | Tuerk et al. |
| 2010/0143589 A1 | 6/2010 | Spinelli et al. |
| 2011/0143055 A1 | 6/2011 | Tuerk et al. |
| 2013/0258017 A1* | 10/2013 | Kagose ............... C09D 11/101 347/102 |
| 2015/0175819 A1* | 6/2015 | Kamada ................ C09D 11/54 347/21 |
| 2015/0247043 A1 | 9/2015 | Berger et al. |
| 2016/0085157 A1* | 3/2016 | Wariishi ................ G03F 7/322 430/302 |
| 2016/0200938 A1 | 7/2016 | Berger et al. |

FOREIGN PATENT DOCUMENTS

| | | |
|---|---|---|
| EP | 2636709 A1 | 9/2013 |
| EP | 3015485 A1 | 5/2016 |
| JP | 2010-518249 A | 5/2010 |
| JP | 2011-507994 A | 3/2011 |
| JP | 2011-530634 A | 12/2011 |
| JP | 2016-505648 A | 2/2016 |
| JP | 2016-529366 A | 9/2016 |
| JP | 2016-204465 A | 12/2016 |
| WO | 2015/158748 A1 | 10/2015 |
| WO | 2016/163394 A1 | 10/2016 |

OTHER PUBLICATIONS

International Search Report issued in International Application No. PCT/JP2018/012226 dated Jun. 12, 2018.
Written Opinion of the ISA issued in International Application No. PCT/JP2018/012226 dated Jun. 12, 2018.
Extended European Search Report dated Mar. 13, 2020, issued in corresponding EP Patent Application No. 18781427.2.

* cited by examiner

*Primary Examiner* — Kristal Feggins
(74) *Attorney, Agent, or Firm* — Solaris Intellectual Property Group, PLLC

(57) ABSTRACT

Provided is an ink composition including: water; particles that each include a polymer having at least one of a urethane bond or a urea bond, and each have a polymerizable group; and a combination of a polymerization inhibitor A1 that is at least one selected from the group consisting of quinone compounds, nitroso compounds, and N-oxyl compounds, and a polymerization inhibitor A2 that is at least one selected from the group consisting of phenol compounds, or a combination of a polymerization inhibitor B1 that is at least one selected from the group consisting of phenol compounds having a solubility of 1.0 g/100 mL or more in water at 25° C., and a polymerization inhibitor B2 that is at least one selected from the group consisting of phenol compounds having a solubility of less than 1.0 g/100 mL in water at 25° C.

8 Claims, No Drawings

INK COMPOSITION, METHOD FOR PRODUCING THE SAME, AND IMAGE-FORMING METHOD

CROSS-REFERENCE TO RELATED APPLICATIONS

This application is a continuation application of International Application No. PCT/JP2018/012226, filed Mar. 26, 2018, the disclosure of which is incorporated herein by reference in its entirety. Further, this application claims priority from Japanese Patent Application No. 2017-074056, filed Apr. 3, 2017, the disclosure of which is incorporated herein by reference in its entirety.

BACKGROUND OF THE INVENTION

1. Field of the Invention

The present disclosure relates to an ink composition, a method for producing the ink composition, and an image-forming method.

2. Description of the Related Art

There are known compositions that include a polymer having a urethane bond and/or a urea bond and water, and have photocurability.

For example, an aqueous UV ink jet ink has been disclosed that includes at least one photopolymerization initiator and capsules constituted by shells composed of a cross-linking polymer surrounding cores, wherein the cores include a UV-curable compound (for example, refer to WO2015/158748A). Paragraph 0081 of WO2015/158748A states that the shells are preferably composed of polyurethane, polyurea, or a combination of these.

In addition, as an aqueous matte coating material that provides matte appearances of coating films, an aqueous matte coating material has been disclosed in which (A) a polyurethane resin not having a polymerizable unsaturated group, (B) a polymerizable compound having a polymerizable unsaturated group and not having a urethane bond, (C) a particulate filler, and optionally (D) a polyurethane resin having a polymerizable unsaturated group are dispersed in an aqueous medium, wherein, relative to the total mass of the (A) polyurethane resin not having a polymerizable unsaturated group, the (B) polymerizable compound, and the (D) polyurethane resin having a polymerizable unsaturated group, the (B) polymerizable compound content is 5 to 70 mass %, and the (C) particulate filler content is 4 to 30 mass % (for example, refer to JP2016-204465A).

In addition, an aqueous dispersion liquid used for a printing ink has been disclosed, the aqueous dispersion liquid including a pigment (B) at least partially surrounded by a polyurethane (A) and at least one polymerization inhibitor (C), wherein the polyurethane (A) is obtained by a reaction of 15 to 70 mass % of (a) a diisocyanate or a polyisocyanate having, on average in a molecule, 1 to 10 allophanate groups and having, on average, 1 to 10 C—C bonds, optionally 0 to 60 mass % of (b) another diisocyanate or polyisocyanate, and 5 to 50 mass % of (c) a compound having at least two groups reactive to isocyanate; and the values in mass % are based on the whole polyurethane (A) (for example, refer to JP2011-530634A).

SUMMARY OF THE INVENTION

The compositions (such as the ink jet ink) described in WO2015/158748A, JP2016-204465A, and JP2011-530634A, and films (such as images) formed from these compositions include, in some cases, particles including a polymer having a urethane bond and/or a urea bond.

In such a case of forming a film including particles, the film is required to be formed with higher glossiness in some instances.

An object of the present disclosure is to provide an ink composition capable of forming an image having higher glossiness, a method for producing the ink composition, and an image-forming method using this ink composition.

Specific means for achieving the object includes the following embodiments.

<1> An ink composition including:
water;
particles that each include a polymer having at least one of a urethane bond or a urea bond, and each have a polymerizable group; and
a combination of a polymerization inhibitor A1 that is at least one selected from the group consisting of quinone compounds, nitroso compounds, and N-oxyl compounds, and a polymerization inhibitor A2 that is at least one selected from the group consisting of phenol compounds, or
a combination of a polymerization inhibitor B1 that is at least one selected from the group consisting of phenol compounds having a solubility of 1.0 g/100 mL or more in water at 25° C., and a polymerization inhibitor B2 that is at least one selected from the group consisting of phenol compounds having a solubility of less than 1.0 g/100 mL in water at 25° C.

<2> The ink composition according to <1>,
wherein the polymerization inhibitor A1 is at least one selected from the group consisting of compounds (A1-1) below, compounds (A1-2) below, salts of the compounds (A1-2) below, and compounds (A1-3) below,
wherein the polymerization inhibitor A2 is at least one selected from the group consisting of compounds (A2-1) below,
wherein the polymerization inhibitor B1 is at least one selected from the group consisting of compounds (B1-1) below, and
wherein the polymerization inhibitor B2 is at least one selected from the group consisting of compounds (B2-1) below,

(A1-1)

(A1-2)

(A1-3)

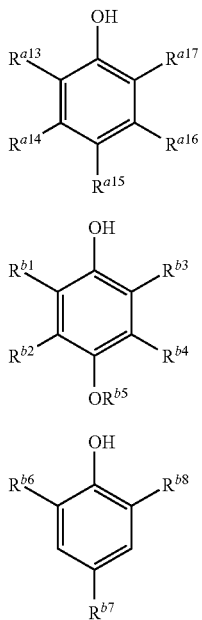

(A2-1)

(B1-1)

(B2-1)

wherein, in the compounds (A1-1), the compounds (A1-2), the compounds (A1-3), and the compounds (A2-1), $R^{a1}$ to $R^{a17}$ each independently represent a hydrogen atom, a chlorine atom, a hydroxy group, an alkyl group that has 1 to 12 carbon atoms and may have a cyclic structure, an alkoxy group that has 1 to 12 carbon atoms and may have a cyclic structure, or an aryl group having 6 to 12 carbon atoms, wherein, in the compounds (A1-1), $R^{a1}$ and $R^{a2}$ may be linked together with each other to form a ring, and $R^{a3}$ and $R^{a4}$ may be linked together with each other to form a ring, wherein, in the compounds (A1-2), $R^{a5}$ and $R^{a6}$ may be linked together with each other to form a ring, wherein, in the compounds (A1-3), $R^{a1}$, $R^{a8}$, or $R^{a9}$ may be linked together with $R^{a10}$, $R^{a11}$, or $R^{a12}$ each other to form a ring, wherein, in the compounds (A2-1), $R^{a13}$ and $R^{a14}$ may be linked together with each other to form a ring, $R^{a14}$ and $R^{a15}$ may be linked together with each other to form a ring, $R^{a15}$ and $R^{a16}$ may be linked together with each other to form a ring, and $R^{a16}$ and $R^{a17}$ may be linked together with each other to form a ring, wherein, in the compounds (B1-1) and the compounds (B2-1), $R^{b1}$ to $R^{b4}$ and $R^{b6}$ to $R^{b8}$ each independently represent a hydrogen atom, a hydroxy group, an alkyl group having 1 to 6 carbon atoms, an alkoxy group having 1 to 6 carbon atoms, or an aryl group having 6 to 12 carbon atoms, wherein, in the compounds (B1-1), $R^{b5}$ represents a hydrogen atom, an alkyl group having 1 to 6 carbon atoms, or an aryl group having 6 to 12 carbon atoms, and wherein, in the compounds (B1-1), $R^{b1}$ and $R^{b2}$ may be linked together with each other to form a ring, $R^{b3}$ and $R^{b4}$ may be linked together with each other to form a ring, $R^{b4}$ and $R^{b5}$ may be linked together with each other to form a ring, and $R^{b2}$ and $R^{b5}$ may be linked together with each other to form a ring.

<3> The ink composition according to <1> or <2>, wherein, in a case of including the combination of the polymerization inhibitor A1 and the polymerization inhibitor A2, a content ratio of the polymerization inhibitor A2 with respect to the polymerization inhibitor A1 is from 10 to 100 in terms of mass, or wherein, in a case of including the combination of the polymerization inhibitor B1 and the polymerization inhibitor B2, a content ratio of the polymerization inhibitor B2 with respect to the polymerization inhibitor B1 is from 10 to 100 in terms of mass.

<4> The ink composition according to any one of <1> to <3>, including the combination of the polymerization inhibitor A1 and the polymerization inhibitor A2.

<5> The ink composition according to <4>, wherein the polymerization inhibitor A1 has a solubility of 1.0 g/100 mL or more in water at 25° C., and/or wherein the polymerization inhibitor A2 has a solubility of less than 1.0 g/100 mL in water at 25° C.

<6> The ink composition according to <4> or <5>, wherein the polymerization inhibitor A1 is at least one selected from the group consisting of p-benzoquinone and 4-hydroxy-2,2,6,6-tetramethylpiperidine 1-oxyl, and wherein the polymerization inhibitor A2 is at least one selected from the group consisting of hydroquinone, p-methoxyphenol, and 3,5-di-tert-butyl-4-hydroxytoluene.

<7> A method for producing the ink composition according to any one of <1> to <6>, the method including:

mixing and emulsifying an oil-phase component and an aqueous-phase component including water, to form the particles, wherein the oil-phase component is (i) an oil-phase component including an organic solvent, the polymer, the polymerization inhibitor A1, the polymerization inhibitor A2, and a polymerizable compound, (ii) an oil-phase component including an organic solvent, a tri- or higher functional isocyanate compound, the polymerization inhibitor A1, the polymerization inhibitor A2, and a polymerizable compound, (iii) an oil-phase component including an organic solvent, the polymer, the polymerization inhibitor B1, the polymerization inhibitor B2, and a polymerizable compound, or (iv) an oil-phase component including an organic solvent, a tri- or higher functional isocyanate compound, the polymerization inhibitor B1, the polymerization inhibitor B2, and a polymerizable compound.

<8> An image-forming method including:

applying the ink composition according to any one of <1> to <6> onto a substrate; and curing the ink composition applied onto the substrate.

The present disclosure provides an ink composition capable of forming an image having high glossiness, a method for producing the ink composition, and an image-forming method using this ink composition.

DESCRIPTION OF THE PREFERRED EMBODIMENTS

In this Specification, ranges defined by a value "to" a value include these values as the minimum value and the maximum value.

In this Specification, the amount of each of components in a composition means, when the composition contains a plurality of substances belonging to such a component, the total amount of the plurality of substances in the composition unless otherwise specified.

In this Specification, the term "step" includes not only an independent step, but also a step that is not clearly distinguished from another step but that achieves the intended result of the step.

In this Specification, "*" in chemical formulas denote bonding positions.

In this Specification, "images" mean any films formed from ink. The concept of "images" encompasses, in addition to patterned images (such as characters, symbols, and figures), solid images.

In this Specification, "light" is a concept that encompasses actinic energy rays such as γ-rays, β-rays, electron beams, ultraviolet radiation, and visible radiation.

In this Specification, ultraviolet radiation is also referred to as "UV (Ultra Violet) light".

In this Specification, light emitted from an LED (Light Emitting Diode) light source is also referred to as "LED light".

In this Specification, "(meth)acrylic acid" is a concept that encompasses both of acrylic acid and methacrylic acid; "(meth)acrylate" is a concept that encompasses both of acrylate and methacrylate; and "(meth)acryloyl group" is a concept that encompasses both of an acryloyl group and a methacryloyl group.

Ink Composition

The ink composition according to the present disclosure (hereafter, also simply referred to as "ink") includes water, particles (hereafter, also referred to as "specified particles") that each include a polymer having at least one of a urethane bond or a urea bond (hereafter, also referred to as "specified polymer") and each have a polymerizable group, and a combination of a polymerization inhibitor A1 that is at least one selected from the group consisting of quinone compounds, nitroso compounds, and N-oxyl compounds, and a polymerization inhibitor A2 that is at least one selected from the group consisting of phenol compounds, or a combination of a polymerization inhibitor B1 that is at least one selected from the group consisting of phenol compounds having a solubility of 1.0 g/100 mL or more in water at 25° C., and a polymerization inhibitor B2 that is at least one selected from the group consisting of phenol compounds having a solubility of less than 1.0 g/100 mL in water at 25° C.

In this Specification, phenol compounds having a solubility of 1.0 g/100 mL or more in water at 25° C. are sometimes referred to as hydrophilic phenol compounds, and phenol compounds having a solubility of less than 1.0 g/100 mL in water at 25° C. are sometimes referred to as hydrophobic phenol compounds.

In this Specification, polymerizable groups mean radical-polymerizable groups.

The ink according to the present disclosure enables formation of an image having high glossiness.

The mechanism of providing such advantages is inferred as follows.

In general, image formation using an ink containing a component having a polymerizable group is performed by curing an ink applied onto a substrate (hereafter, also referred to as "ink film") by radical polymerization. In such image formation, when the ink contains particles including a polymer having a urethane bond and/or a urea bond (hereafter, also simply referred to as "particles"), an image having low glossiness tends to be formed. This phenomenon is inferentially associated with the fact that oxygen inhibits radical polymerization so that the surface of the ink film exhibits a curing rate lower than the curing rate of the inside of the ink film, and the fact that the ink film includes the particles. Specifically, the ink film exhibits different curing rates between the surface and the inside, which causes difference in curing shrinkage between the surface and the inside; this difference in curing shrinkage causes wrinkling in the surface of the image, which results in lower glossiness of the image. When the ink film does not contain the particles, the cure-shrunk ink film (image) deforms to reduce wrinkling in the surface of the image, which tends to result in a reduction in the decrease in the glossiness of the image. However, when the ink film contains the particles, the cure-shrunk ink film (image) has high hardness, so that the reduction in wrinkling tends not to occur in the surface of the cure-shrunk image, which inferentially results in an image having a glossiness remaining low.

However, there are cases where such an ink containing a component having a polymerizable group and containing the particles needs to be used in order to form an image having high hardness and high glossiness.

In this regard, the ink according to the present disclosure includes the combination of the polymerization inhibitor A1 and the polymerization inhibitor A2, or the combination of the polymerization inhibitor B1 and the polymerization inhibitor B2, which inferentially enables a reduction in the difference between the curing rate in the surface of the ink film and the curing rate in the inside of the ink film. Thus, the above-described wrinkling in the surface of the image inferentially becomes less likely to occur. As a result, the ink according to the present disclosure inferentially enables, in spite of including particles, formation of an image having high glossiness.

More specifically, the polymerization inhibitor A1, which is at least one selected from the group consisting of quinone compounds, nitroso compounds, and N-oxyl compounds, is an anaerobic polymerization inhibitor (specifically, a polymerization inhibitor that exerts a polymerization inhibition function in the absence of oxygen), and has a function of suppressing excessive radical polymerization mainly inside of the ink film.

On the other hand, the polymerization inhibitor A2, which is at least one selected from the group consisting of phenol compounds, is an aerobic polymerization inhibitor (specifically, a polymerization inhibitor that exerts a polymerization inhibition function in the presence of oxygen), and has a function of suppressing excessive radical polymerization mainly in the surface of the ink film.

When the ink contains the combination of the polymerization inhibitor A1 and the polymerization inhibitor A2, the curing-rate balance between the surface of the ink film and the inside of the ink film is improved, which inferentially results in a reduction in the difference between the curing rate in the surface of the ink film and the curing rate in the inside of the ink film.

The polymerization inhibitor B1, which is at least one selected from the group consisting of hydrophilic phenol compounds, has a function of suppressing excessive radical polymerization in the inside of the ink film.

On the other hand, the polymerization inhibitor B2, which is at least one selected from the group consisting of hydrophobic phenol compounds, has a function of suppressing excessive radical polymerization in the surface of the ink film.

When the ink contains the combination of the polymerization inhibitor B1 and the polymerization inhibitor B2, the curing-rate balance between the surface of the ink film and the inside of the ink film is also maintained, which inferentially results in a reduction in the difference between the curing rate in the surface of the ink film and the curing rate in the inside of the ink film.

The ink according to the present disclosure also exhibits high stability (such as ejection stability during ejection through an ink jet head).

The mechanism of this is inferred as follows: the polymerization inhibitor A1 having anaerobic properties or the polymerization inhibitor B1 having hydrophilicity exerts an effect of suppressing gelation of the ink being stored (for example, gelation of a region of the ink, the region being not in contact with the air), and the polymerization inhibitor A2 having aerobic properties or the polymerization inhibitor B2 having hydrophobicity exerts an effect of suppressing gelation of the ink being prepared (for example, gelation of a region of the ink, the region being in contact with the air).

Hereinafter, components that can be included in the ink according to the present disclosure will be described.

Polymerization Inhibitors

The ink according to the present disclosure contains the combination of the polymerization inhibitor A1 and the polymerization inhibitor A2, or the combination of the polymerization inhibitor B1 and the polymerization inhibitor B2.

When the ink according to the present disclosure includes the combination of the polymerization inhibitor A1 and the polymerization inhibitor A2, at least one selected from the group consisting of the polymerization inhibitor A1 and the polymerization inhibitor A2 may be included in the specified particles (in other words, may be present inside of the specified particles), or may not be included in the specified particles (in other words, may be present outside of the specified particles).

When the ink according to the present disclosure includes the combination of the polymerization inhibitor B1 and the polymerization inhibitor B2, at least one selected from the group consisting of the polymerization inhibitor B1 and the polymerization inhibitor B2 may be included in the specified particles (in other words, may be present inside of the specified particles), or may not be included in the specified particles (in other words, may be present outside of the specified particles).

Polymerization Inhibitor A1

The polymerization inhibitor A1 is at least one selected from the group consisting of quinone compounds, nitroso compounds, and N-oxyl compounds.

Such a quinone compound serving as the polymerization inhibitor A1 is preferably the following compound (A1-1).

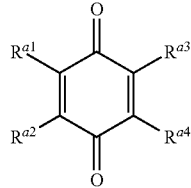

(A1-1)

In the compound (A1-1), $R^{a1}$ to $R^{a4}$ each independently represent a hydrogen atom, a chlorine atom, a hydroxy group, an alkyl group that has 1 to 12 carbon atoms and may have a cyclic structure, an alkoxy group that has 1 to 12 carbon atoms and may have a cyclic structure, or an aryl group having 6 to 12 carbon atoms.

In the compound (A1-1), $R^{a1}$ and $R^{a2}$ may be linked together with each other to form a ring, and $R^{a3}$ and $R^{a4}$ may be linked together with each other to form a ring.

In the compound (A1-1), for $R^{a1}$ to $R^{a4}$, the alkyl group that has 1 to 12 carbon atoms and may have a cyclic structure, the alkoxy group that has 1 to 12 carbon atoms and may have a cyclic structure, and the aryl group having 6 to 12 carbon atoms may each have a substituent.

Examples of the substituent include an alkyl group, an aryl group, a fluoro group, a chloro group, a bromo group, a hydroxy group, an amino group, a sulfanyl group, an alkoxy group, an alkylsulfanyl group, a carboxy group, an alkoxycarbonyl group, and a nitrile group.

In the compound (A1-1), $R^{a1}$ to $R^{a4}$ each independently represent preferably a hydrogen atom, a methyl group, an isopropyl group, or a tert-butyl group, more preferably a hydrogen atom, a methyl group, or a tert-butyl group, still more preferably a hydrogen atom or a tert-butyl group, particularly preferably a hydrogen atom.

The compound (A1-1) is preferably p-benzoquinone (BQ) or 2-tert-butyl-1,4-benzoquinone (TBQ), particularly preferably p-benzoquinone.

A nitroso compound serving as the polymerization inhibitor A1 is preferably the following compound (A1-2) or a salt of the following compound (A1-2).

(A1-2)

In the compound (A1-2), $R^{a5}$ and $R^{a6}$ each independently represent a hydrogen atom, a chlorine atom, a hydroxy group, an alkyl group that has 1 to 12 carbon atoms and may have a cyclic structure, an alkoxy group that has 1 to 12 carbon atoms and may have a cyclic structure, or an aryl group having 6 to 12 carbon atoms.

In the compound (A1-2), $R^{a5}$ and $R^{a6}$ may be linked together with each other to form a ring.

In the compound (A1-2), for $R^{a5}$ and $R^{a6}$, the alkyl group that has 1 to 12 carbon atoms and may have a cyclic structure, the alkoxy group that has 1 to 12 carbon atoms and may have a cyclic structure, and the aryl group having 6 to 12 carbon atoms may each have a substituent.

Examples of the substituent include an alkyl group, an aryl group, a fluoro group, a chloro group, a bromo group, a hydroxy group, an amino group, a sulfanyl group, an alkoxy group, an alkylsulfanyl group, a carboxy group, an alkoxycarbonyl group, and a nitrile group.

In the compound (A1-2), $R^{a5}$ and $R^{a6}$ each independently represent preferably a methyl group, an ethyl group, an isopropyl group, a tert-butyl group, a phenyl group, a methoxy group, or a hydroxy group, more preferably a tert-butyl group, a phenyl group, a methoxy group, or a hydroxy group, particularly preferably a phenyl group or a hydroxy group.

The salt of the compound (A1-2) is preferably a complex salt of the compound (A1-2) in which one of $R^{a5}$ and $R^{a6}$ is a hydroxy group. The metal in the complex salt is preferably aluminum, cobalt, or manganese.

The salt of the compound (A1-2) is preferably an N-nitrosophenylhydroxylamine aluminum salt, an N-nitrosophenylhydroxylamine cobalt salt, an N-nitrosophenylhydroxylamine manganese salt, or an N-nitrosophenylhydroxylamine ammonium salt, particularly preferably an N-nitrosophenylhydroxylamine aluminum salt.

An N-oxyl compound serving as the polymerization inhibitor A1 is preferably the following compound (A1-3).

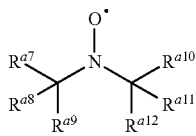

(A1-3)

In the compound (A1-3), $R^{a7}$ to $R^{a12}$ each independently represent a hydrogen atom, a chlorine atom, a hydroxy group, an alkyl group that has 1 to 12 carbon atoms and may have a cyclic structure, an alkoxy group that has 1 to 12 carbon atoms and may have a cyclic structure, or an aryl group having 6 to 12 carbon atoms.

In the compound (A1-3), $R^{a7}$, $R^{a8}$, or $R^{a9}$ may be linked together with $R^{a10}$, $R^{a11}$, or $R^{a12}$ each other to form a ring.

In the compound (A1-3), for $R^{a7}$ to $R^{a12}$, the alkyl group that has 1 to 12 carbon atoms and may have a cyclic structure, the alkoxy group that has 1 to 12 carbon atoms and may have a cyclic structure, and the aryl group having 6 to 12 carbon atoms may each have a substituent.

Examples of the substituent include an alkyl group, an aryl group, a fluoro group, a chloro group, a bromo group, a hydroxy group, an amino group, a sulfanyl group, an alkoxy group, an alkylsulfanyl group, a carboxy group, an alkoxycarbonyl group, and a nitrile group.

In the compound (A1-3), $R^{a7}$ to $R^{a12}$ each independently represent preferably a methyl group, a cyclohexyl group, a tert-butyl group, or a phenyl group, more preferably a methyl group, a cyclohexyl group, or a phenyl group, particularly preferably a methyl group or a cyclohexyl group.

When $R^{a7}$, $R^{a8}$, or $R^{a9}$ are linked together with $R^{a10}$, $R^{a11}$, or $R^{a12}$ each other to form a ring, the formed ring is preferably a five-membered ring or six-membered ring including N (nitrogen atom) in the compound (A1-3).

The formed ring is more preferably substituted with a methyl group, a hydroxy group, or a methoxy group, particularly preferably substituted with a methyl group or a hydroxy group.

The compound (A1-3) is particularly preferably 4-hydroxy-2,2,6,6-tetramethylpiperidine 1-oxyl (4OH-TEMPO).

As described above, the polymerization inhibitor A1 is an anaerobic polymerization inhibitor, and has a function of suppressing excessive radical polymerization mainly inside of the ink film.

The polymerization inhibitor A1 preferably has, from the viewpoint of further suppressing excessive radical polymerization inside of the ink film, a solubility of 1.0 g/100 mL or more in water at 25° C. (more preferably 1.3 g/100 mL or more).

From the above-described viewpoint, the polymerization inhibitor A1 is particularly preferably p-benzoquinone or 4-hydroxy-2,2,6,6-tetramethylpiperidine 1-oxyl.

Polymerization Inhibitor A2

The polymerization inhibitor A2 is at least one selected from the group consisting of phenol compounds.

Such a phenol compound serving as the polymerization inhibitor A2 is preferably the following compound (A2-1).

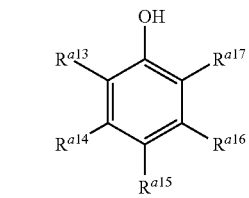

(A2-1)

In the compound (A2-1), $R^{a1}$ to $R^{a17}$ each independently represent a hydrogen atom, a chlorine atom, a hydroxy group, an alkyl group that has 1 to 12 carbon atoms and may have a cyclic structure, an alkoxy group that has 1 to 12 carbon atoms and may have a cyclic structure, or an aryl group having 6 to 12 carbon atoms.

In the compound (A2-1), $R^{a13}$ and $R^{a14}$ may be linked together with each other to form a ring, $R^{a14}$ and $R^{a15}$ may be linked together with each other to form a ring, $R^{a15}$ and $R^{a16}$ may be linked together with each other to form a ring, and $R^{a16}$ and $R^{a17}$ may be linked together with each other to form a ring.

In the compound (A2-1), for $R^{a13}$ to $R^{a17}$, the alkyl group that has 1 to 12 carbon atoms and may have a cyclic structure, the alkoxy group that has 1 to 12 carbon atoms and may have a cyclic structure, and the aryl group having 6 to 12 carbon atoms may each have a substituent.

Examples of the substituent include an alkyl group, an aryl group, a fluoro group, a chloro group, a bromo group, a hydroxy group, an amino group, a sulfanyl group, an alkoxy group, an alkylsulfanyl group, a carboxy group, an alkoxycarbonyl group, and a nitrile group.

In the compound (A2-1), $R^{a13}$ to $R^{a17}$ each independently represent preferably a methyl group, a tert-butyl group, a phenyl group, a methoxy group, or a hydroxy group, more preferably a methyl group, a tert-butyl group, a phenyl group, or a methoxy group, particularly preferably a methyl group or a tert-butyl group.

When $R^{a13}$ and $R^{a14}$, $R^{a14}$ and $R^{a15}$, $R^{a15}$ and $R^{a16}$, or $R^{a16}$ and $R^{a17}$ are linked together with each other to form a ring, the formed ring is preferably an aromatic ring.

In the compound (A2-1), $R^{a14}$ to $R^{a16}$ each independently represent preferably a methoxy group or a hydroxy group, particularly preferably a methoxy group.

The compound (A2-1) is particularly preferably hydroquinone (HQ), p-methoxyphenol (MEHQ), or 3,5-di-tert-butyl-4-hydroxytoluene (BHT).

As described above, the polymerization inhibitor A2 is an aerobic polymerization inhibitor, and has a function of suppressing excessive radical polymerization mainly in the surface of the ink film.

The polymerization inhibitor A2 preferably has, from the viewpoint of further suppressing excessive radical polymerization in the surface of the ink film, a solubility of less than 1.0 g/100 mL in water at 25° C.

From the above-described viewpoint, the polymerization inhibitor A2 is particularly preferably 3,5-di-tert-butyl-4-hydroxytoluene (BHT).

When the ink according to the present disclosure contains the polymerization inhibitor A1 and the polymerization inhibitor A2, from the viewpoint of providing higher glossiness, preferably the polymerization inhibitor A1 has a solubility of 1.0 g/100 mL or more in water at 25° C. (more preferably 1.3 g/100 mL or more) and/or (more preferably, and) the polymerization inhibitor A2 has a solubility of less than 1.0 g/100 mL in water at 25° C.

From the viewpoint of providing higher glossiness, the combination of the polymerization inhibitor A1 and the polymerization inhibitor A2 is particularly preferably a combination of, as the polymerization inhibitor A1, p-benzoquinone or 4-hydroxy-2,2,6,6-tetramethylpiperidine 1-oxyl, and, as the polymerization inhibitor A2, 3,5-di-tert-butyl-4-hydroxytoluene.

Polymerization Inhibitor B1

The polymerization inhibitor B1 is at least one selected from the group consisting of hydrophilic phenol compounds.

The hydrophilic phenol compounds have a solubility of 1.0 g/100 mL or more in water at 25° C., preferably 1.3 g/100 mL or more.

Such a hydrophilic phenol compound serving as the polymerization inhibitor B1 is preferably the following compound (B1-1).

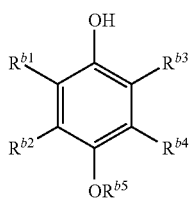

(B1-1)

In the compound (B1-1), $R^{b1}$ to $R^{b4}$ each independently represent a hydrogen atom, a hydroxy group, an alkyl group having 1 to 6 carbon atoms, an alkoxy group having 1 to 6 carbon atoms, or an aryl group having 6 to 12 carbon atoms, and $R^{b5}$ represents a hydrogen atom, an alkyl group having 1 to 6 carbon atoms, or an aryl group having 6 to 12 carbon atoms. In the compound (B1-1), $R^{b1}$ and $R^{b2}$ may be linked together with each other to form a ring, $R^{b3}$ and $R^{b4}$ may be linked together with each other to form a ring, $R^{b4}$ and $R^{b5}$ may be linked together with each other to form a ring, or $R^{b2}$ and $R^{b5}$ may be linked together with each other to form a ring.

In the compound (B1-1), for $R^{b1}$ to $R^{b5}$, the alkyl group having 1 to 6 carbon atoms and the aryl group having 6 to 12 carbon atoms, and, for $R^{b1}$ to $R^{b4}$, the alkoxy group having 1 to 6 carbon atoms may each have a substituent.

Examples of the substituent include an alkyl group, an aryl group, a fluoro group, a chloro group, a bromo group, a hydroxy group, an amino group, a sulfanyl group, an alkoxy group, an alkylsulfanyl group, a carboxy group, an alkoxycarbonyl group, and a nitrile group.

In the compound (B1-1), $R^{b1}$ to $R^{b4}$ each independently represent preferably a hydrogen atom, a methyl group, a tert-butyl group, a phenyl group, a methoxy group, or a hydroxy group, more preferably a hydrogen atom, a methyl group, a tert-butyl group, a methoxy group, or a hydroxy group, particularly preferably a hydrogen atom, a methyl group, or a tert-butyl group.

In the compound (B1-1), $R^{b5}$ preferably represents a hydrogen atom, a methyl group, a tert-butyl group, or a phenyl group, more preferably a hydrogen atom, a methyl group, or a tert-butyl group, particularly preferably a hydrogen atom or a methyl group.

When $R^{b1}$ and $R^{b2}$, or $R^{b3}$ and $R^{b4}$ are linked together with each other to form a ring, the formed ring is preferably an aromatic ring.

The compound (B1-1) is particularly preferably hydroquinone (HQ) or p-methoxyphenol (MEHQ).

Polymerization Inhibitor B2

The polymerization inhibitor B2 is at least one selected from the group consisting of hydrophobic phenol compounds.

Such a hydrophobic phenol compound serving as the polymerization inhibitor B2 is preferably the following compound (B2-1).

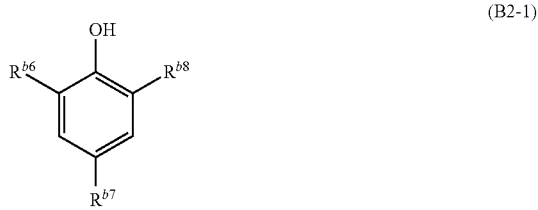

(B2-1)

In the compound (B2-1), $R^{b6}$ to $R^{b8}$ each independently represent a hydrogen atom, a hydroxy group, an alkyl group having 1 to 6 carbon atoms, an alkoxy group having 1 to 6 carbon atoms, or an aryl group having 6 to 12 carbon atoms.

In the compound (B2-1), for $R^{b6}$ to $R^{b8}$, the alkyl group having 1 to 6 carbon atoms, the alkoxy group having 1 to 6 carbon atoms, and the aryl group having 6 to 12 carbon atoms may each have a substituent.

Examples of the substituent include an alkyl group, an aryl group, a fluoro group, a chloro group, a bromo group, a hydroxy group, an amino group, a sulfanyl group, an alkoxy group, an alkylsulfanyl group, a carboxy group, an alkoxycarbonyl group, and a nitrile group.

In the compound (B2-1), $R^{b6}$ to $R^{b8}$ each independently represent preferably a methyl group, a tert-butyl group, a phenyl group, a methoxy group, or a hydroxy group, more preferably a methyl group, a tert-butyl group, a methoxy group, or a hydroxy group, particularly preferably a methyl group or a tert-butyl group.

The compound (B2-1) is particularly preferably 3,5-di-tert-butyl-4-hydroxytoluene (BHT).

When the ink according to the present disclosure contains the polymerization inhibitor A1 and the polymerization inhibitor A2, the content ratio of the polymerization inhibitor A2 with respect to the polymerization inhibitor A1 (hereafter, also referred to as "A2/A1") is, in terms of mass, preferably from 1 to 180, more preferably from 5 to 180, still more preferably from 10 to 100, particularly preferably from 20 to 100.

When A2/A1 is 1 or more, the image has higher hardness.

When A2/A1 is 180 or less, the image has higher glossiness.

When the ink according to the present disclosure contains the polymerization inhibitor A1 and the polymerization inhibitor A2, the total content of the polymerization inhibitor A1 and the polymerization inhibitor A2 relative to the total amount of the ink is preferably 0.01 mass % to 2 mass %, more preferably 0.01 mass % to 1 mass %, still more preferably 0.1 mass % to 1 mass %, yet more preferably 0.3 mass % to 1 mass %.

When the ink according to the present disclosure contains the combination of the polymerization inhibitor A1 and the polymerization inhibitor A2, the ink according to the present disclosure may further contain a polymerization inhibitor other than the polymerization inhibitor A1 and the polymerization inhibitor A2.

Examples of the polymerization inhibitor other than the polymerization inhibitor A1 and the polymerization inhibitor A2 include zinc dimethyldithiocarbamate, copper dimethyldithiocarbamate, copper dibutyldithiocarbamate, copper salicylate, thiodipropionate compounds, mercaptobenzimidazole, and phosphite compounds.

When the ink according to the present disclosure contains the polymerization inhibitor A1 and the polymerization inhibitor A2, the percentage of the polymerization inhibitor A1 and the polymerization inhibitor A2 relative to the whole polymerization inhibitor contained in the ink is preferably 50 mass % to 100 mass %, more preferably 60 mass % to 100 mass %, still more preferably 80 mass % to 100 mass %.

When the ink according to the present disclosure contains the polymerization inhibitor B1 and the polymerization inhibitor B2, a content ratio of the polymerization inhibitor B2 with respect to the polymerization inhibitor B1 (hereafter, also referred to as "B2/B") is, in terms of mass, preferably from 1 to 180, more preferably from 5 to 180, still more preferably from 10 to 100, particularly preferably from 20 to 100.

When B2/B1 is 1 or more, the image has higher hardness.

When B2/B1 is 180 or less, the image has higher glossiness.

When the ink according to the present disclosure contains the polymerization inhibitor B1 and the polymerization inhibitor B2, the total content of the polymerization inhibitor B1 and the polymerization inhibitor B2 relative to the total amount of the ink is preferably 0.01 mass % to 2 mass %, more preferably 0.01 mass % to 1 mass %, still more preferably 0.1 mass % to 1 mass %, yet more preferably 0.3 mass % to 1 mass %.

When the ink according to the present disclosure contains the polymerization inhibitor B1 and the polymerization inhibitor B2, the ink according to the present disclosure may further contain a polymerization inhibitor other than the polymerization inhibitor B1 and the polymerization inhibitor B2.

Examples of the polymerization inhibitor other than the polymerization inhibitor B1 and the polymerization inhibitor B2 include zinc dimethyldithiocarbamate, copper dimethyldithiocarbamate, copper dibutyldithiocarbamate, copper salicylate, thiodipropionate compounds, mercaptobenzimidazole, and phosphite compounds.

When the ink according to the present disclosure contains the polymerization inhibitor B1 and the polymerization inhibitor B2, the percentage of the polymerization inhibitor B1 and the polymerization inhibitor B2 relative to the whole polymerization inhibitor contained in the ink is preferably 50 mass % to 100 mass %, more preferably 60 mass % to 100 mass %, still more preferably 80 mass % to 100 mass %.

The ink according to the present disclosure preferably contains the combination of the polymerization inhibitor A1 and the polymerization inhibitor A2.

When the ink according to the present disclosure contains the combination of the polymerization inhibitor A1 and the polymerization inhibitor A2, the image has higher glossiness.

A particularly preferred embodiment of the combination of the polymerization inhibitor A1 and the polymerization inhibitor A2 is the same as that described above.

Incidentally, in this Specification, the concept of the polymerization inhibitor A2, which is at least one selected from the group consisting of phenol compounds, encompasses both of the polymerization inhibitor B1, which is at least one selected from the group consisting of hydrophilic phenol compounds, and the polymerization inhibitor B2, which is at least one selected from the group consisting of hydrophobic phenol compounds.

Thus, the concept of "contain the combination of the polymerization inhibitor A1 and the polymerization inhibitor A2" encompasses an embodiment of containing the combination of the polymerization inhibitor A1 and the polymerization inhibitor A2 corresponding to the polymerization inhibitor B1, an embodiment of containing the combination of the polymerization inhibitor A1 and the polymerization inhibitor A2 corresponding to the polymerization inhibitor B2, and an embodiment of containing the combination of the polymerization inhibitor A1, the polymerization inhibitor A2 corresponding to the polymerization inhibitor B1, and the polymerization inhibitor A2 corresponding to the polymerization inhibitor B2.

Specified Particles

The specified particles include a specified polymer (specifically, a polymer having at least one of a urethane bond or a urea bond), and have a polymerizable group.

Specified Polymer

The specified particles include at least one specified polymer.

The specified polymer has at least one of a urethane bond or a urea bond.

The specified polymer may be a linear polymer not having a crosslinked structure (hereafter, also referred to as "specified chain polymer"), or may be a polymer having a crosslinked structure (for example, a three-dimensional crosslinked structure) (hereafter, also referred to as "specified crosslinked polymer").

The specified chain polymer may include, in the main chain, a cyclic structure such as an aliphatic ring, an aromatic ring, or a heterocycle.

Regarding the three-dimensional crosslinked structure optionally present in the specified crosslinked polymer, reference may be made to three-dimensional crosslinked structures described in WO2016/052053A.

Specified Chain Polymer

The specified chain polymer is preferably a reaction product of at least one selected from the group consisting of bifunctional isocyanate compounds, and at least one selected from the group consisting of compounds intramolecularly having two active hydrogen groups and water, or a reaction product of at least one selected from the group consisting of bifunctional isocyanate compounds, at least one selected from the group consisting of compounds intramolecularly having two active hydrogen groups and water, and another compound.

In this Specification, such an active hydrogen group means a hydroxy group, a primary amino group, a secondary amino group, or a thiol group.

Examples of such a compound intramolecularly having two active hydrogen groups include diol compounds, diamine compounds, and dithiol compounds.

For example, a reaction of a bifunctional isocyanate compound and a diol compound forms urethane bonds.

A reaction of a bifunctional isocyanate compound and a diamine compound forms urea bonds.

A reaction of a bifunctional isocyanate compound and water forms urea bonds.

Examples of the other compound include:

among polymerizable-group-introducing compounds described later, compounds including a single active hydrogen group alone, among polymerizable-group-introduced isocyanate compounds described later, compounds including a single isocyanate group alone, among hydrophilic-group-introducing compounds described later, compounds including a single active hydrogen group alone, and among hydrophilic-group-introduced isocyanate compounds described later, compounds including a single isocyanate group alone.

Examples of the bifunctional isocyanate compounds for forming the specified chain polymer include the following Compounds (1-1) to (1-20).

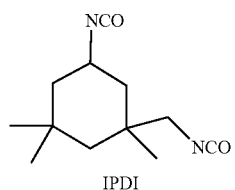
IPDI (1-1)

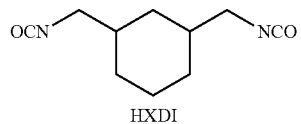
HXDI (1-2)

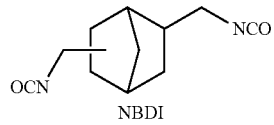
NBDI (1-3)

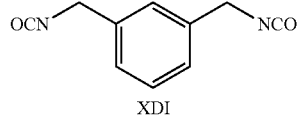
XDI (1-4)

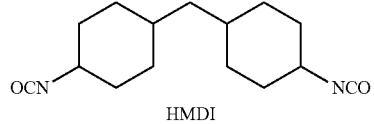
HMDI (1-5)

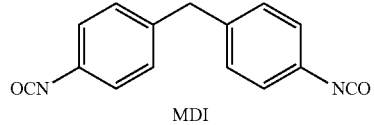
MDI (1-6)

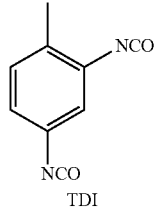
TDI (1-7)

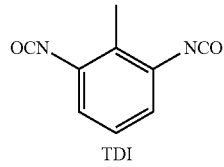
TDI (1-8)

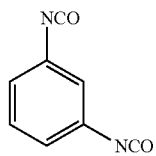
(1-9)

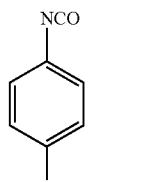
(1-10)

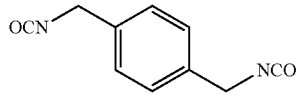
(1-11)

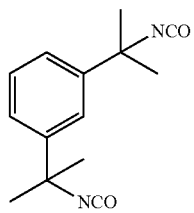
(1-12)

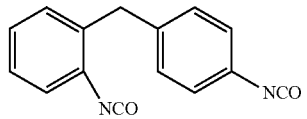
(1-13)

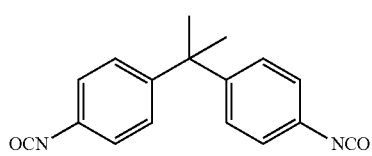
(1-14)

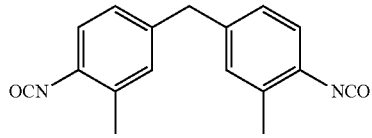
(1-15)

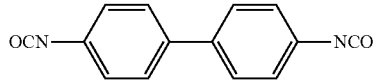
(1-16)

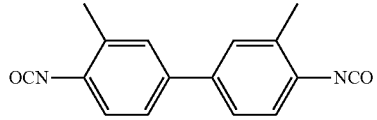
(1-17)

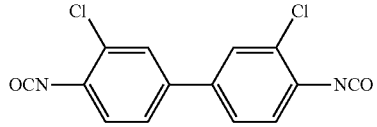
(1-18)

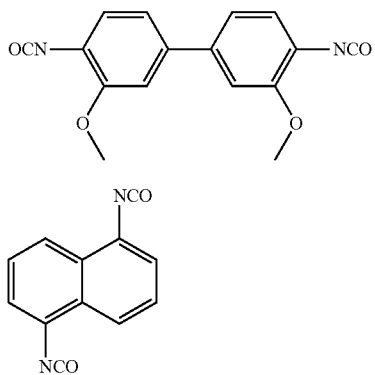
Examples of the compounds intramolecularly having two active hydrogen groups and used for forming the specified chain polymer include the following Compounds (2-1) to (2-24).
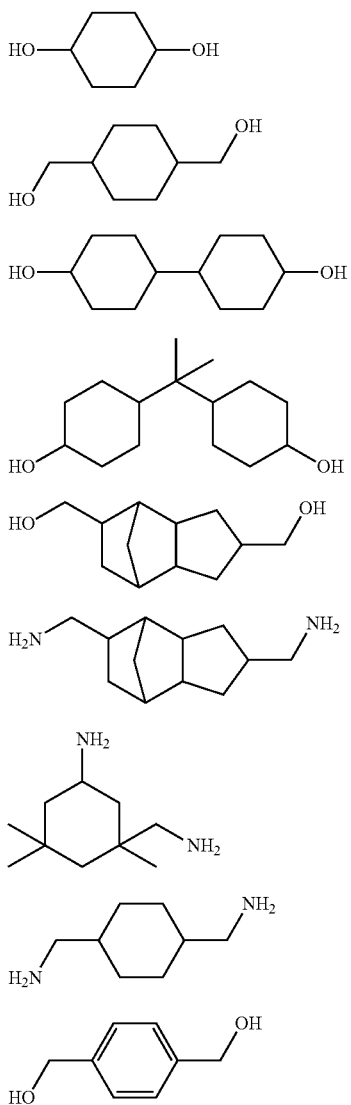
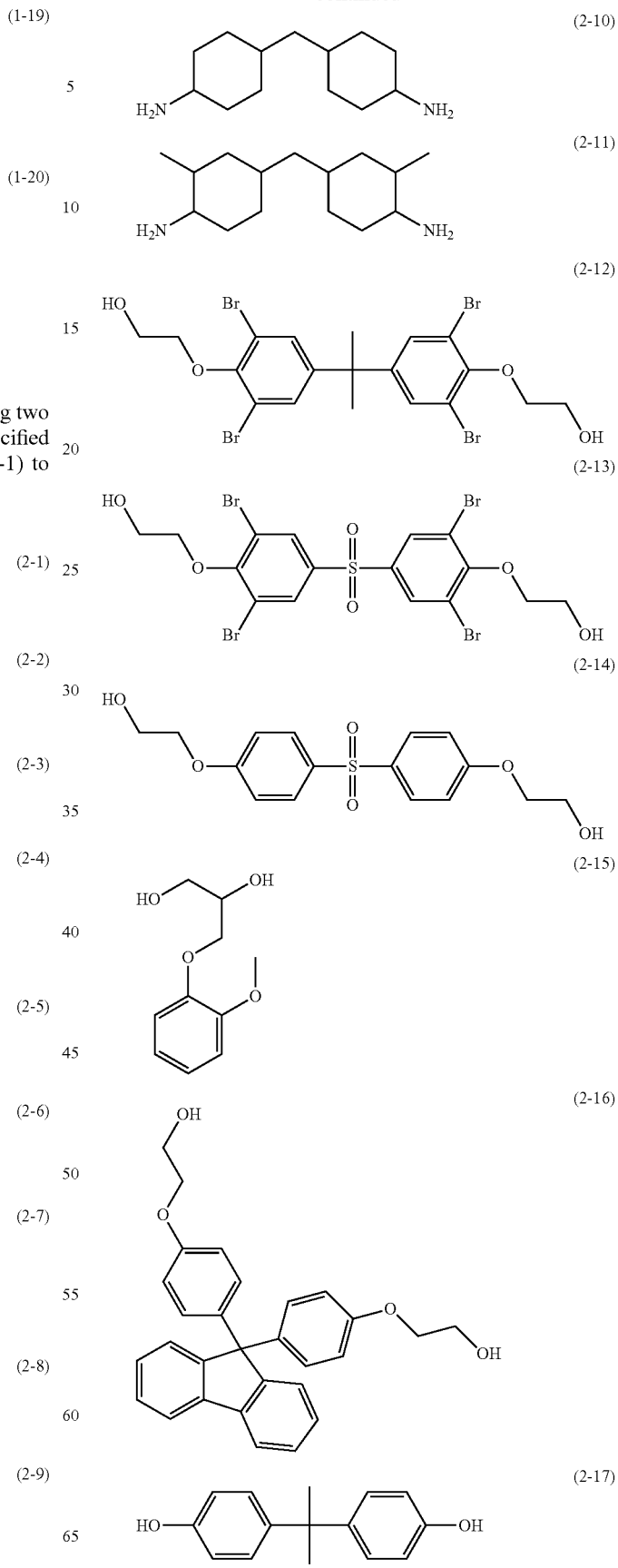

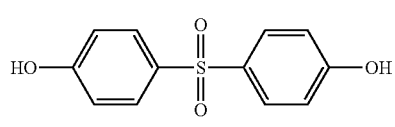
(2-18)

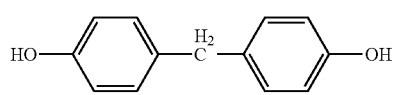
(2-19)

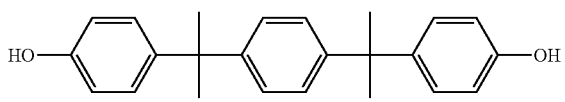
(2-20)

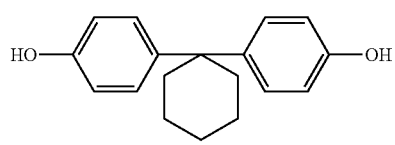
(2-21)

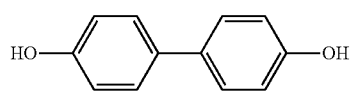
(2-22)

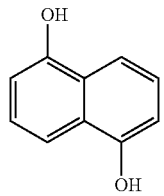
(2-23)

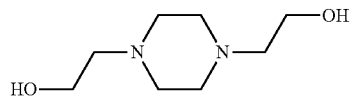
(2-24)

Other examples of the compounds intramolecularly having two active hydrogen groups and used for forming the specified chain polymer include, among polymerizable-group-introducing compounds described later, compounds including two active hydrogen groups, and, among hydrophilic-group-introducing compounds described later, compounds including two active hydrogen groups.

Specified Crosslinked Polymer

The specified crosslinked polymer is preferably a reaction product of at least one selected from the group consisting of tri- or higher functional isocyanate compounds, and at least one selected from the group consisting of compounds intramolecularly having two or more active hydrogen groups and water, or a reaction product of at least one selected from the group consisting of tri- or higher functional isocyanate compounds, at least one selected from the group consisting of compounds intramolecularly having two or more active hydrogen groups and water, and another compound.

Examples of the other compound include:

among polymerizable-group-introducing compounds described later, compounds including a single active hydrogen group alone, among polymerizable-group-introduced isocyanate compounds described later, compounds including a single isocyanate group alone, among hydrophilic-group-introducing compounds described later, compounds including a single active hydrogen group alone, and among hydrophilic-group-introduced isocyanate compounds described later, compounds including a single isocyanate group alone.

When the specified particles include the specified crosslinked polymer, the specified particles preferably include microcapsules (hereafter, "MC") including a shell composed of the specified crosslinked polymer and a core.

Examples of the compound used for forming the specified crosslinked polymer and intramolecularly having two or more active hydrogen groups include, as in the above-described compound intramolecularly having two active hydrogen groups and used for forming the specified chain polymer, diol compounds, diamine compounds, and dithiol compounds.

Other examples of the compound used for forming the specified crosslinked polymer and intramolecularly having two or more active hydrogen groups include tri- or higher functional polyol compounds, tri- or higher functional polyamine compounds, and tri- or higher functional polythiol compounds.

Such a tri- or higher functional isocyanate compound for forming the specified crosslinked polymer is preferably a reaction product of at least one selected from the group consisting of bifunctional isocyanate compounds, and at least one selected from the group consisting of compounds intramolecularly having three or more active hydrogen groups (such as tri- or higher functional polyol compounds, tri- or higher functional polyamine compounds, and tri- or higher functional polythiol compounds).

The number of moles (the number of molecules) of such a bifunctional isocyanate compound that is to react with such a compound intramolecularly having three or more active hydrogen groups is preferably 0.6 or more times, more preferably 0.6 times to 5 times, still more preferably 0.6 times to 3 times, still more preferably 0.8 times to 2 times, the number of moles of the active hydrogen groups (the number of equivalents of the active hydrogen groups) of the compound intramolecularly having three or more active hydrogen groups.

Examples of the bifunctional isocyanate compound for forming the tri- or higher functional isocyanate compound include the same as those described above for the bifunctional isocyanate compound for forming the specified chain polymer.

Examples of the compound intramolecularly having three or more active hydrogen groups for forming the tri- or higher functional isocyanate compound include compounds having structures represented by the following (H-1) to (H-13). In the following structures, n represents an integer selected from 1 to 100.

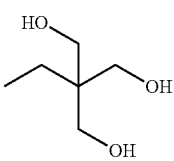
(H-1)

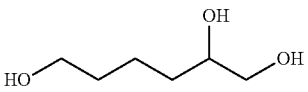
(H-2)

(H-3) 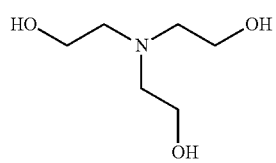
(H-4) 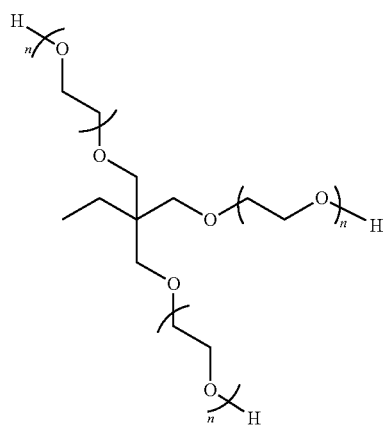
(H-5) 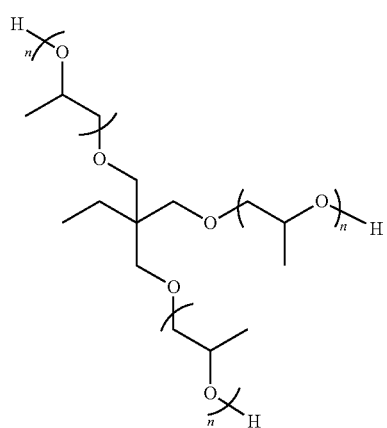
(H-6) 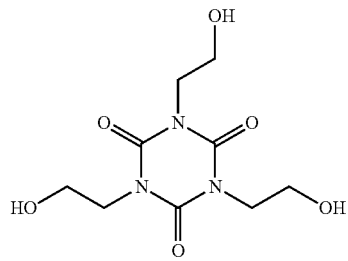
(H-7) 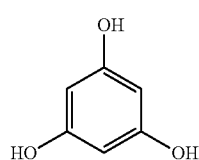
(H-8) 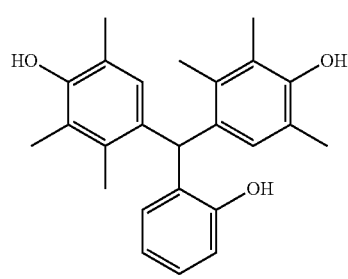
(H-9) 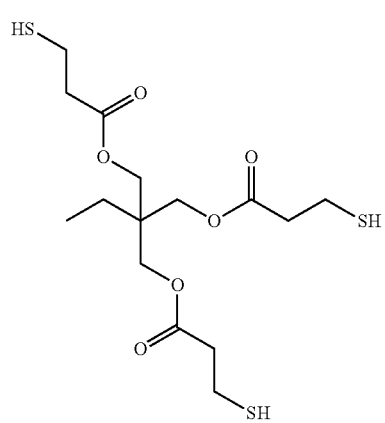
(H-10) 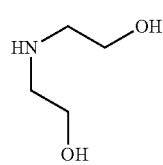
(H-11) 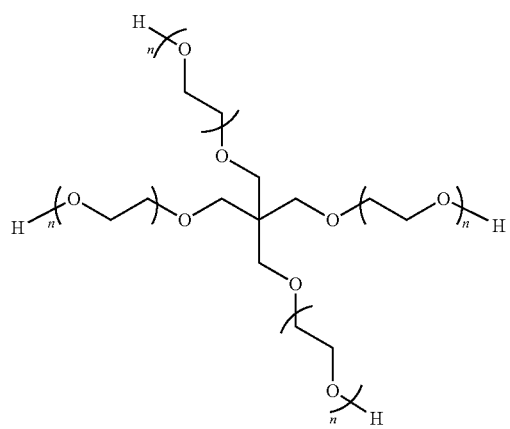
(H-12) 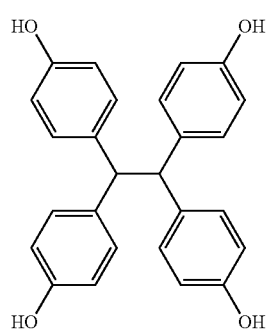

(H-13)

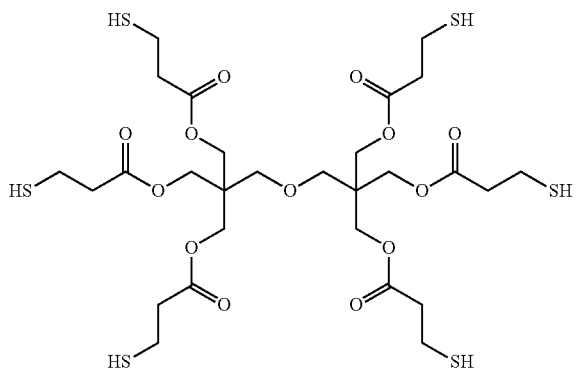

Examples of the tri- or higher functional isocyanate compound for forming the specified crosslinked polymer include adduct-type tri- or higher functional isocyanate compounds, isocyanurate-type tri- or higher functional isocyanate compounds, and biuret-type tri- or higher functional isocyanate compounds.

Examples of the commercially available products of the adduct-type tri- or higher functional isocyanate compounds include TAKENATE (registered trademark) D-102, D-103, D-103H, D-103M2, P49-75S, D-1 ON, D-120N, D-140N, D-160N (all from Mitsui Chemicals, Inc.), DESMODUR (registered trademark) L75, UL57SP (Sumika Bayer Urethane Co., Ltd.), CORONATE (registered trademark) HL, HX, L (Nippon Polyurethane Industry Co., Ltd.), and P301-75E (Asahi Kasei Corporation).

Examples of the commercially available products of the isocyanurate-type tri- or higher functional isocyanate compounds include TAKENATE (registered trademark) D-127N, D-170N, D-170HN, D-172N, D-177N (all from Mitsui Chemicals, Inc.), SUMIDUR N3300, DESMODUR (registered trademark) N3600, N3900, Z4470BA (all from Sumika Bayer Urethane Co., Ltd.), CORONATE (registered trademark) HX, HK (all from Nippon Polyurethane Industry Co., Ltd.), and DURANATE (registered trademark) TPA-100, TKA-100, TSA-100, TSS-100, TLA-100, and TSE-100 (all from Asahi Kasei Corporation).

Examples of the commercially available products of the biuret-type tri- or higher functional isocyanate compounds include TAKENATE (registered trademark) D-165N, NP1100 (all from Mitsui Chemicals, Inc.), DESMODUR (registered trademark) N3200 (Sumika Bayer Urethane Co., Ltd.), and DURANATE (registered trademark) 24A-100 (Asahi Kasei Corporation).

When the specified particles include MC (namely, microcapsules) including a shell composed of the specified crosslinked polymer and a core, the specified particles may contain, as a dispersing agent for MC, among the above-described specified chain polymers, a specified chain polymer having a hydrophilic group. In this case, in the ink, at least peripheral portions of the shells of MC can be covered with the specified chain polymer serving as a dispersing agent. In this case, an interaction between a urethane bond and/or a urea bond of the shells of MC and a urethane bond and/or a urea bond of the dispersing agent (specified chain polymer), and the dispersing effect exerted by the hydrophilic group of the dispersing agent synergistically provide higher dispersion stability of the specified particles.

In this case, the ratio of the amount of the dispersing agent to the total solid-content amount of MC (hereafter, also referred to as the mass ratio [dispersing agent/MC solid content]) is preferably 0.005 to 1.000, more preferably 0.05 to 0.7.

When the mass ratio [dispersing agent/MC solid content] is 0.005 or more, the specified particles exhibit higher dispersion stability.

When the mass ratio [dispersing agent/MC solid content] is 1.000 or less, the image has higher hardness.

Preferred Weight-Average Molecular Weight (Mw) of Specified Polymer

The weight-average molecular weight (Mw) of the specified polymer is, from the viewpoint of the dispersion stability of the ink (specifically, the dispersion stability of the specified particles), preferably 5000 or more, more preferably 7000 or more, still more preferably 8000 or more, particularly preferably 10000 or more.

The upper limit of Mw of the specified polymer is not particularly limited. The upper limit of Mw of the specified polymer is, for example, 150000, 100000, 70000, or 50000.

In this Specification, the weight-average molecular weight (Mw) means a value measured by gel permeation chromatography (GPC).

In this Specification, measurement by gel permeation chromatography (GPC) can be performed with a measurement device of an HLC (registered trademark)-8020GPC (Tosoh Corporation), three columns of TSKgel (registered trademark) Super Multipore HZ-H (4.6 mm ID×15 cm, Tosoh Corporation), and an eluent that is THF (tetrahydrofuran). The measurement conditions are a sample concentration of 0.45 mass %, a flow rate of 0.35 ml/min, a sample injection amount of 10 μl, a measurement temperature of 40° C., and use of a differential refractive index (RI) detector.

The calibration curve is created with "Standard samples TSK standard, polystyrene" from Tosoh Corporation: 8 samples of "F-40", "F-20", "F-4", "F-1", "A-5000", "A-2500", "A-1000", and "n-propylbenzene".

The specified polymer content relative to the solid-content amount of the specified particles is preferably 10 mass % or more, more preferably 20 mass % or more.

When the specified polymer content relative to the solid-content amount of the specified particles is 10 mass % or more, the ink has higher dispersion stability (specifically, the dispersion stability of the specified particles).

The specified polymer content relative to the solid-content amount of the specified particles may be 100 mass %, but is preferably 80 mass % or less, more preferably 70 mass % or less, particularly preferably 50 mass % or less.

Polymerizable Group

The specified particles have at least one polymerizable group species.

The polymerizable group (namely, a radical-polymerizable group) of the specified particles contributes to curing of an image by radical polymerization.

The polymerizable group of the specified particles may covalently bond to the specified polymer, or may not covalently bond to the specified polymer. Stated another way, the specified polymer may have a polymerizable group, or the specified polymer may not have a polymerizable group.

The specified particles having a polymerizable group not covalently bonding to the specified polymer mean that the specified particles include a compound having a polymerizable group (namely, a polymerizable compound).

The specified particles including a polymerizable group covalently bonding to the specified polymer mean that the specified polymer itself has a polymerizable group.

Hereafter, the polymerizable group and the polymerizable compound are also simply referred to as, respectively, "polymerizable group" and "polymerizable compound".

The polymerizable group is more preferably a group including an ethylenically double bond, still more preferably a (meth)acryloyl group, an allyl group, a styryl group, or a vinyl group. The polymerizable group is, from the viewpoint of radical polymerization reactivity and the hardness of a film to be formed, particularly preferably a (meth)acryloyl group.

The fact that the specified particles have a polymerizable group can be confirmed by, for example, Fourier transform infrared spectroscopy (FT-IR).

In the ink of the present disclosure, from the viewpoint of providing an image having higher hardness, the specified particles preferably include a polymerizable compound.

Preferred examples of the polymerizable compound included in the specified particles will be described later.

Polymerizable-Group-Introducing Compound

In the case of the specified polymer having a polymerizable group, the polymerizable group can be introduced into the specified polymer by using a polymerizable-group-introducing compound.

The polymerizable-group-introducing compound may be a compound having a polymerizable group and an active hydrogen group. Herein, such an active hydrogen group means a hydroxy group, an amino group, or a thiol group.

The polymerizable-group-introducing compound is preferably a compound having one or more polymerizable groups and two or more active hydrogen groups.

The method of introducing a polymerizable group into the specified polymer is not particularly limited. A particularly preferred method is, during synthesis of the specified polymer, to cause a reaction of at least one selected from the group consisting of bifunctional isocyanate compounds, at least one selected from the group consisting of water, diol compounds, diamine compounds, and dithiol compounds, and at least one polymerizable-group-introducing compound (and optionally at least one hydrophilic-group-introducing compound).

Such polymerizable-group-introducing monomer species may be used alone or in combination of two or more thereof.

Other examples of the polymerizable-group-introducing compound include compounds described in Paragraphs 0075 to 0089 of WO2016/052053A.

The polymerizable-group-introducing compound is preferably a compound represented by the following formula (ma).

$$L^1Lc_mZ_n \quad \text{(ma)}$$

In the formula (ma), $L^1$ represents an m+n-valent linking group; m and n each independently represent an integer selected from 1 to 100; Lc represents a monovalent ethylenically unsaturated group; and Z represents an active hydrogen group.

$L^1$ preferably represents a di- or higher valent aliphatic group, a di- or higher valent aromatic group, a di- or higher valent heterocyclic group, —O—, —S—, —NH—, —N<, —CO—, —SO—, —SO$_2$—, or a combination of the foregoing.

m and n each independently represent preferably 1 to 50, more preferably 2 to 20, still more preferably 3 to 10, particularly preferably 3 to 5.

Examples of the monovalent ethylenically unsaturated group represented by Lc include an allyl group, a vinyl group, an acryloyl group, and a methacryloyl group.

The active hydrogen group represented by Z is, for example, a hydroxy group, an amino group (a primary amino group or a secondary amino group), or a mercapto group, more preferably a hydroxy group or a primary amino group, still more preferably a hydroxy group.

The following are examples of the polymerizable-group-introducing compound; however, the polymerizable-group-introducing compound is not limited to the following examples. Incidentally, n's in Compounds (a-3) and (a-14) represent, for example, an integer selected from 1 to 90.

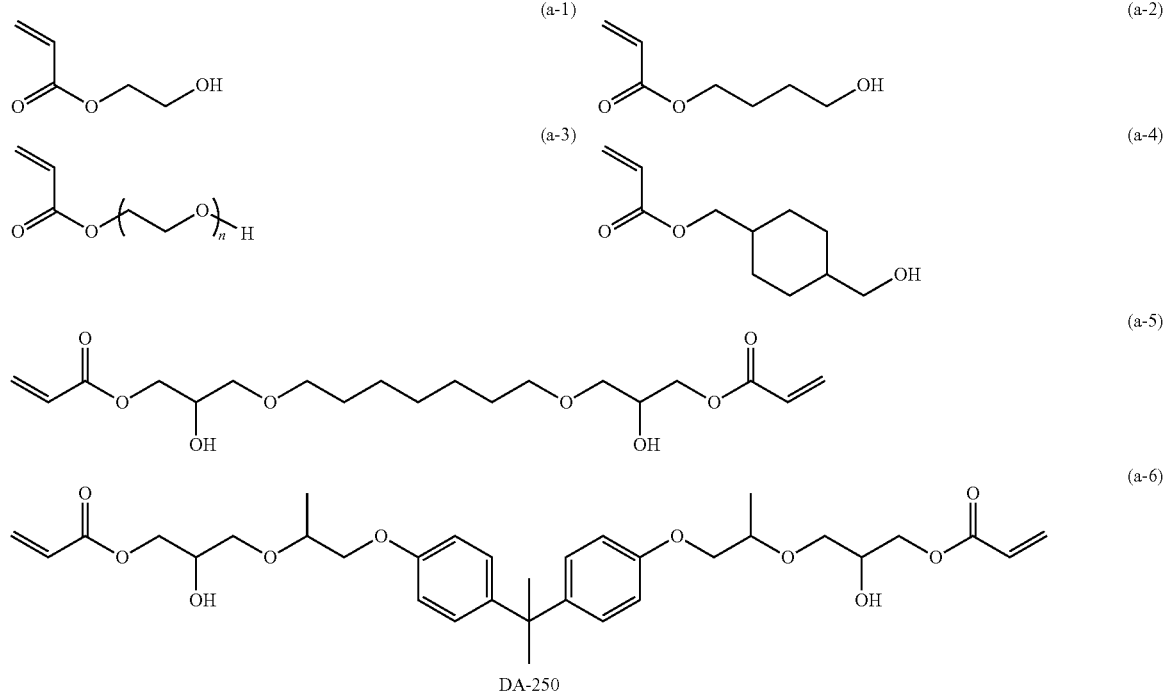

-continued
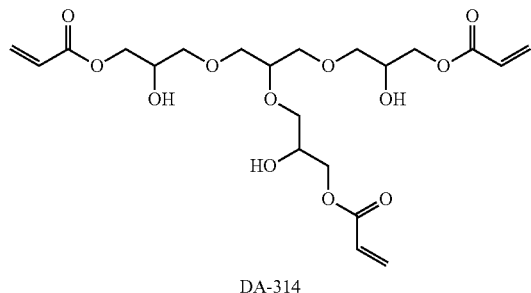
(a-7)
DA-314
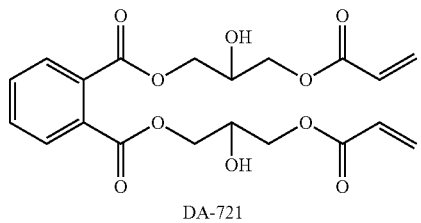
(a-8)
DA-721
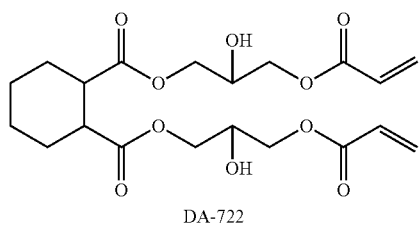
(a-9)
DA-722
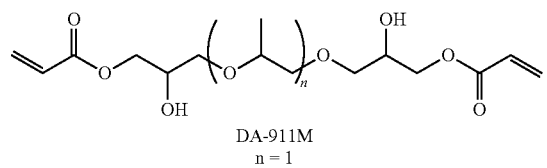
(a-10)
DA-911M
n = 1
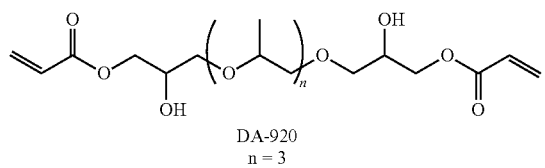
(a-11)
DA-920
n = 3
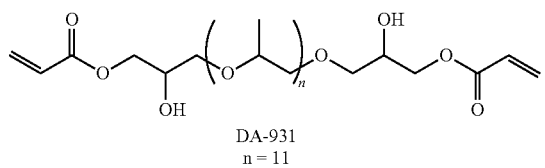
(a-12)
DA-931
n = 11
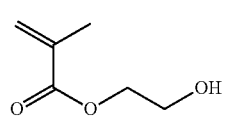
(a-13)
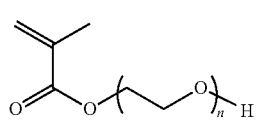
(a-14)
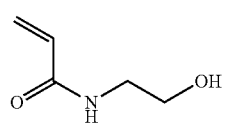
(a-15)
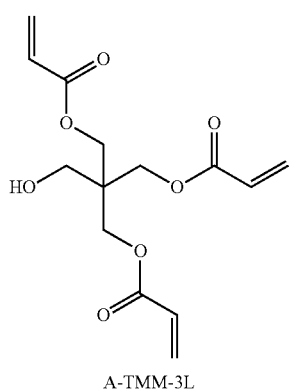
(a-16)
A-TMM-3L

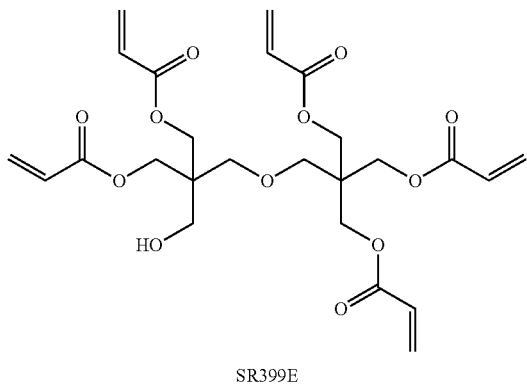

SR399E (a-17)

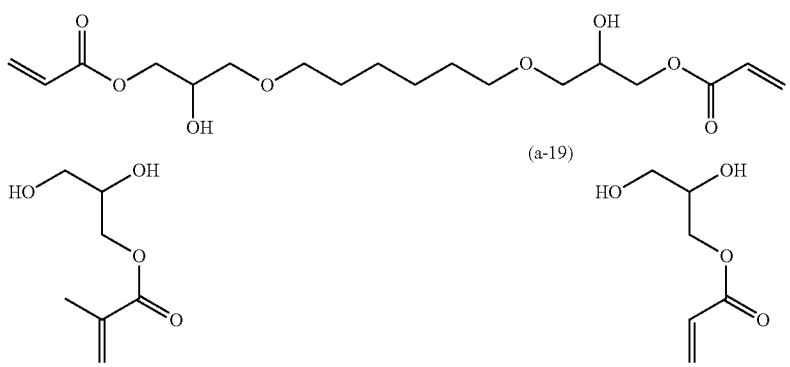

(a-18)

(a-19) (a-20)

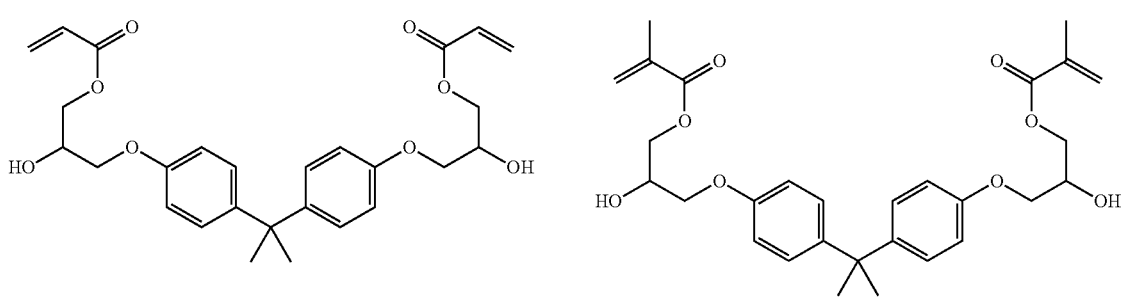

(a-21) (a-22)

Polymerizable-Group-Introduced Isocyanate Compound

In the case of the specified polymer having a polymerizable group, the polymerizable group can also be introduced into the specified polymer by using a polymerizable-group-introduced isocyanate compound.

Examples of the polymerizable-group-introduced isocyanate compound include:

a reaction product of at least one of the above-described polymerizable-group-introducing compounds, and at least one of bifunctional isocyanate compounds;

a reaction product of at least one of the above-described polymerizable-group-introducing compounds, and at least one of tri- or higher functional isocyanate compounds; and a reaction product of at least one of the above-described polymerizable-group-introducing compounds, at least one of bifunctional isocyanate compounds, and at least one selected from the group consisting of tri- or higher functional polyol compounds, tri- or higher functional polyamine compounds, and tri- or higher functional polythiol compounds.

Hydrophilic Group

The specified particles may have at least one hydrophilic group species.

When the specified particles have a hydrophilic group, the ink has higher dispersion stability (for example, storage stability and ejection stability).

The hydrophilic group is preferably an anionic group or a nonionic group, and, from the viewpoint of a strong effect of providing higher dispersion stability, preferably an anionic group.

For example, a comparison between an anionic group and a nonionic group of the same molecular weight reveals that the anionic group exerts a stronger effect of providing higher dispersion stability. Thus, an anionic group (particularly preferably at least one selected from the group consisting of a carboxy group and salts of a carboxy group), even in the case of having a low molecular weight, can sufficiently exert the effect of providing higher dispersion stability.

The nonionic group may be a group having a polyether structure, preferably a monovalent group including a polyalkyleneoxy group.

The anionic group may be an unneutralized anionic group, or may be a neutralized anionic group.

Examples of the unneutralized anionic group include a carboxy group, a sulfo group, a sulfuric acid group, a phosphonic acid group, and a phosphoric acid group.

Examples of the neutralized anionic group include salts of a carboxy group, salts of a sulfo group, salts of a sulfuric acid group, salts of a phosphonic acid group, and salts of phosphoric acid group.

In this Specification, "a carboxy group is neutralized" means that a carboxy group as an anionic group is turned into the form of a "salt" (for example, "—COONa"). The same applies to, as anionic groups, a sulfo group, a sulfuric acid group, a phosphonic acid group, and a phosphoric acid group.

The neutralization may be achieved by using, for example, an alkali metal hydroxide (for example, sodium hydroxide or potassium hydroxide) or an organic amine (for example, triethylamine).

The anionic group that may be included in the specified particles is, from the viewpoint of dispersion stability, preferably at least one selected from the group consisting of a carboxy group, salts of a carboxy group, a sulfo group, salts of a sulfo group, a sulfuric acid group, salts of a sulfuric acid group, a phosphonic acid group, salts of a phosphonic acid group, a phosphoric acid group, and salts of a phosphoric acid group, more preferably at least one selected from the group consisting of a carboxy group and salts of a carboxy group.

In the above-described salts of a carboxy group, salts of a sulfo group, salts of a sulfuric acid group, salts of a phosphonic acid group, and salts of a phosphoric acid group, "salts" are preferably alkali metal salts or organic amine salts, more preferably alkali metal salts.

In the alkali metal salts, the alkali metal is preferably K or Na.

When the specified particles have a neutralized anionic group, the neutralization degree of the anionic group (such as a carboxy group) of the specified particles is preferably 50% to 100%.

In this Specification, the "neutralization degree of the anionic group" means, for all the anionic groups of the specified particles, a ratio of the number of moles of neutralized anionic groups to the total of the number of moles of neutralized anionic groups and the number of moles of unneutralized anionic groups [Number of moles of neutralized acid groups/(Number of moles of neutralized acid groups+Number of moles of unneutralized acid groups).]

When the neutralization degree of the anionic group is 50% or more, the specified particles have higher dispersion stability.

The neutralization degree of the anionic group is preferably 50% to 95%, more preferably 80% to 95%, still more preferably 90% to 95%.

The neutralized anionic group (specifically, the anionic group in the form of salt) exhibits basicity. When the neutralization degree of the anionic group is 95% or less, hydrolysis of a urethane bond and/or a urea bond of the specified polymer can be further suppressed.

The neutralization degree can be determined by neutralization titration.

Hydrophilic-Group-Introducing Compound

In the case of the specified particles in which the specified polymer has a hydrophilic group, the hydrophilic group can be introduced into the specified polymer by using a hydrophilic-group-introducing compound.

The hydrophilic-group-introducing compound may be a compound having a hydrophilic group and an active hydrogen group. Herein, such an active hydrogen group means a hydroxy group, an amino group, or a thiol group.

The hydrophilic-group-introducing compound is preferably a compound having one or more hydrophilic groups and two or more active hydrogen groups.

Among hydrophilic-group-introducing compounds, examples of anionic-group-introducing compounds include amino acids such as α-amino acids (specifically, lysine, alanine, arginine, asparagine, aspartic acid, cysteine, glutamine, glutamic acid, glycine, histidine, isoleucine, leucine, methionine, phenylalanine, proline, serine, threonine, tryptophan, tyrosine, and valine).

Specific examples of the anionic-group-introducing compound include, in addition to the above-described α-amino acids, the following.

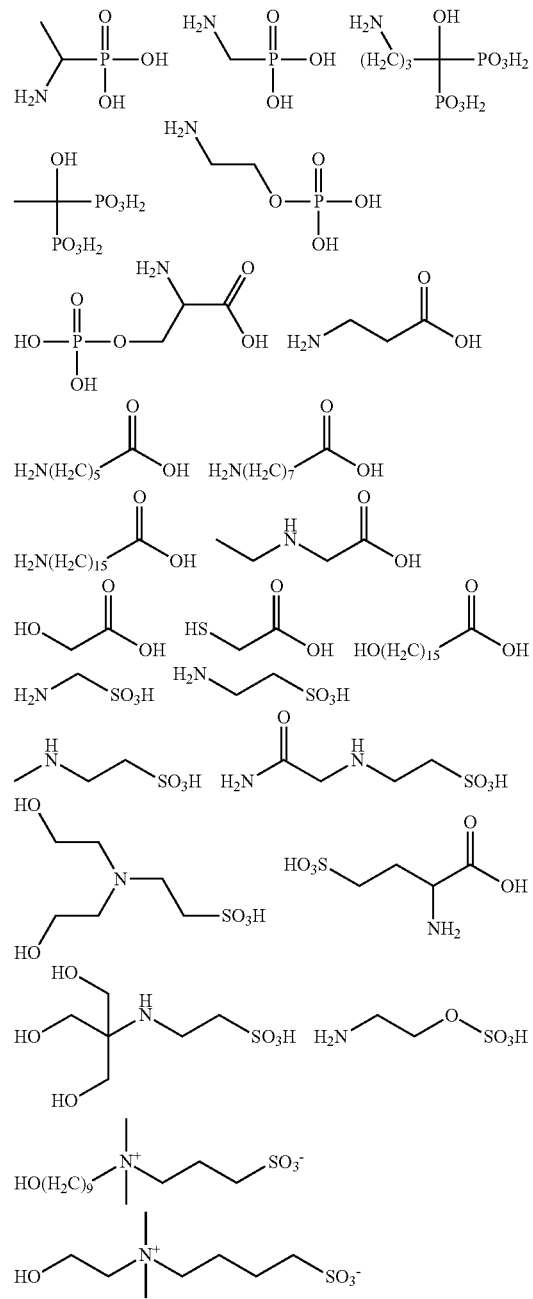

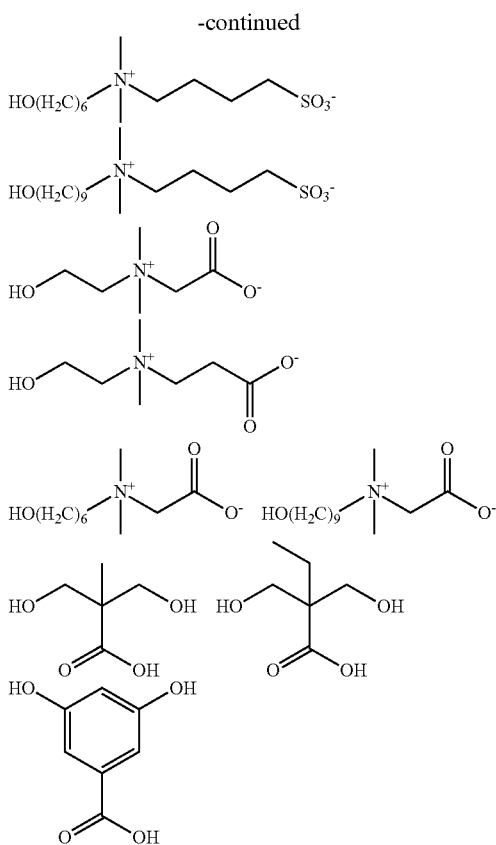

In such an anionic-group-introducing compound, the anionic group may be at least partially neutralized using, for example, an inorganic base such as sodium hydroxide or potassium hydroxide, or an organic base such as triethylamine.

Among the hydrophilic-group-introducing compounds, the nonionic-group-introducing compound is preferably a compound having a polyether structure, more preferably a compound having a polyoxyalkylene group.

Hydrophilic-Group-Introduced Isocyanate Compound

In the case of the specified particles in which the specified polymer has a hydrophilic group, the hydrophilic group can also be introduced into the specified polymer by using a hydrophilic-group-introduced isocyanate compound.

Examples of the hydrophilic-group-introduced isocyanate compound include:

a reaction product of at least one of the above-described hydrophilic-group-introducing compounds, and at least one of bifunctional isocyanate compounds;

a reaction product of at least one of the above-described hydrophilic-group-introducing compounds, and at least one of tri- or higher functional isocyanate compounds; and a reaction product of at least one of the above-described hydrophilic-group-introducing compounds, at least one of bifunctional isocyanate compounds, and at least one selected from the group consisting of tri- or higher functional polyol compounds, tri- or higher functional polyamine compounds, and tri- or higher functional polythiol compounds.

Specific examples of the hydrophilic-group-introduced isocyanate compound include adducts of trimethylolpropane (TMP), m-xylylene diisocyanate (XDI), and polyethylene glycol monomethyl ether (EO) (for example, TAKENATE (registered trademark) D-116N, manufactured by Mitsui Chemicals, Inc.).

Polymerizable Compound

The specified particles preferably include, as a compound having a polymerizable group (such as a photopolymerizable group or a thermal-polymerizable group), a polymerizable compound (such as a photopolymerizable compound or a thermal-polymerizable compound). In this case, an image having higher hardness is provided.

When the specified particles include a polymerizable compound, the specified particles may include a single polymerizable compound alone, or two or more polymerizable compounds. When the specified particles include a polymerizable compound, the polymerizable group of the polymerizable compound functions as the polymerizable group of the specified particles.

Incidentally, in the case of the specified particles including a polymerizable compound, the specified polymer may have a polymerizable group.

The polymerizable compound that can be included in the specified particles may be compounds described in Paragraphs 0097 to 0105 of WO2016/052053A.

The polymerizable compound that can be included in the specified particles may be any one of a polymerizable monomer, a polymerizable oligomer, and a polymerizable polymer, but is preferably a polymerizable monomer from the viewpoint of providing a film having higher curing sensitivity and higher hardness.

The content (total content in the case of including two or more species) of the polymerizable compound (preferably a polymerizable monomer. The same applies to the following description.) that can be included in the specified particles relative to the solid-content amount of the specified particles is, from the viewpoint of providing a film having higher curing sensitivity and higher hardness, preferably 10 mass % to 90 mass %, more preferably 20 mass % to 80 mass %, still more preferably 30 mass % to 70 mass %.

From the viewpoint of providing an image having higher adhesion to the substrate, at least one polymerizable compound (such as a photopolymerizable compound) that can be included in the specified particles is preferably a polymerizable compound having a cyclic structure (hereafter, also referred to as "cyclic polymerizable compound").

From the viewpoint of providing an image having higher adhesion to the substrate, at least one polymerizable compound (such as a photopolymerizable compound) that can be included in the specified particles is preferably a polymerizable compound including, in a single molecule, one or more cyclic structures and two or more (meth)acryloyl groups (hereafter, also referred to as "bi- or higher functional cyclic polymerizable compound").

Examples of the bi- or higher functional cyclic polymerizable compound include:

tricyclodecanedimethanol di(meth)acrylate,
bisphenol A ethylene oxide (EO) adduct di(meth)acrylate,
bisphenol A propylene oxide (PO) adduct di(meth)acrylate,
ethoxylated bisphenol A di(meth)acrylate,
alkoxylated dimethyloltricyclodecane di(meth)acrylate,
alkoxylated cyclohexanonedimethanol di(meth)acrylate, and
cyclohexanonedimethanol di(meth)acrylate.

When the specified particles include a polymerizable compound, the percentage of a bi- or higher functional cyclic polymerizable compound relative to the whole polymerizable compound is preferably 10 mass % to 100 mass %, more preferably 30 mass % to 100 mass %, particularly preferably 40 mass % to 100 mass %.

The specified particles may include a bi- or lower functional polymerizable compound (preferably a bi- or lower functional polymerizable monomer. The same applies to the following description.), and a tri- or higher functional polymerizable compound (preferably a tri- or higher functional polymerizable monomer. The same applies to the following description.).

When the specified particles include a bi- or lower functional polymerizable compound and a tri- or higher functional polymerizable compound, the bi- or lower functional polymerizable compound inferentially contributes to adhesion of the film to the substrate, and the tri- or higher functional polymerizable compound inferentially contributes to higher hardness of the film.

The molecular weight of the polymerizable compound is preferably a weight-average molecular weight of 100 to 100000, more preferably 100 to 30000, still more preferably 100 to 10000, still more preferably 100 to 4000, still more preferably 100 to 2000, still more preferably 100 to 1000, still more preferably 100 to 900, still more preferably 100 to 800, particularly preferably 150 to 750.

The weight-average molecular weight of the polymerizable compound is measured by gel permeation chromatography (GPC). The measurement conditions of GPC are the same as those described above. However, when the molecular weight is so low that the weight-average molecular weight cannot be accurately measured by GPC, the molecular weight determined from the chemical structure of the polymerizable compound is employed as the weight-average molecular weight of the polymerizable compound.

Examples of the polymerizable compound include an acrylate compound, a methacrylate compound, a styrene compound, a vinylnaphthalene compound, an N-vinyl heterocyclic compound, unsaturated polyester, unsaturated polyether, unsaturated polyamide, and unsaturated urethane.

The polymerizable monomer is preferably a compound having an ethylenically unsaturated group.

When the specified particles include the polymerizable monomer, the specified particles may include a single polymerizable monomer species alone, or may include two or more polymerizable monomer species.

Examples of the acrylate compound include monofunctional acrylate compounds such as 2-hydroxyethyl acrylate, butoxyethyl acrylate, carbitol acrylate, cyclohexyl acrylate, tetrahydrofurfuryl acrylate, benzyl acrylate, tridecyl acrylate, 2-phenoxyethyl acrylate (PEA), bis(4-acryloxypolyethoxyphenyl)propane, oligoester acrylate, epoxy acrylate, isobornyl acrylate (IBOA), dicyclopentenyl acrylate, dicyclopentenyloxyethyl acrylate, dicyclopentanyl acrylate, cyclic trimethylolpropane formal acrylate, 2-(2-ethoxyethoxy)ethyl acrylate, 2-(2-vinyloxyethoxy)ethyl acrylate, octyl acrylate, decyl acrylate, isodecyl acrylate, lauryl acrylate, 3,3,5-trimethylcyclohexyl acrylate, 4-t-butylcyclohexyl acrylate, isoamyl acrylate, stearyl acrylate, isoamyl stil acrylate, isostearyl acrylate, 2-ethylhexyldiglycol acrylate, 2-hydroxybutyl acrylate, 2-acryloyloxyethylhydrophthalic acid, ethoxy diethylene glycol acrylate, methoxy diethylene glycol acrylate, methoxypolyethylene glycol acrylate, methoxy propylene glycol acrylate, 2-hydroxy-3-phenoxypropyl acrylate, vinyl ether acrylate, 2-acryloyloxyethylsuccinic acid, 2-acryloyloxyphthalic acid, 2-acryloxyethyl-2-hydroxyethylphthalic acid, lactone-modified acrylate, acryloyl morpholine, acrylamide, and substituted acrylamide (such as N-methylol acrylamide, and diacetone acrylamide);

bifunctional acrylate compounds such as polyethylene glycol diacrylate, polypropylene glycol diacrylate, polytetramethylene glycol diacrylate, 1,3-butylene glycol diacrylate, 1,4-butanediol diacrylate, 1,6-hexanediol diacrylate (HDDA), 1,9-nonanediol diacrylate (NDDA), 1,10-decanediol diacrylate (DDDA), 3-methylpentadiol diacrylate (3MPDDA), neopentyl glycol diacrylate, tricyclodecanedimethanol diacrylate, bisphenol A ethylene oxide (EO) adduct diacrylate, bisphenol A propylene oxide (PO) adduct diacrylate, ethoxylated bisphenol A diacrylate, hydroxylated neopentyl glycol diacrylate, propoxylated neopentyl glycol diacrylate, alkoxylated dimethyloltricyclodecane diacrylate, polytetramethylene glycol diacrylate, alkoxylated cyclohexanonedimethanol diacrylate, alkoxylated hexanediol diacrylate, dioxane glycol diacrylate, cyclohexanonedimethanol diacrylate, diethylene glycol diacrylate, neopentyl glycol diacrylate, tetraethylene glycol diacrylate, dipropylene glycol diacrylate, tripropylene glycol diacrylate (TPGDA), and neopentyl glycol propylene oxide adduct diacrylate; and tri- or higher functional acrylate compounds such as trimethylolpropane triacrylate, pentaerythritol triacrylate, dipentaerythritol tetraacrylate, ethoxylated isocyanurate triacrylate, ε-caprolactone-modified tris-(2-acryloxyethyl) isocyanurate, ditrimethylolpropane tetraacrylate, dipentaerythritol pentaacrylate, dipentaerythritol hexaacrylate, ethoxylated trimethylolpropane triacrylate, propoxylated trimethylolpropane triacrylate, caprolactone-modified trimethylolpropane triacrylate, pentaerythritol tetraacrylate, pentaerythritolethoxy tetraacrylate, glycerolpropoxy triacrylate, ethoxylated dipentaerythritol hexaacrylate, caprolactam-modified dipentaerythritol hexaacrylate, propoxylated glycerol triacrylate, ethoxylated trimethylolpropane triacrylate, and propoxylated trimethylolpropane triacrylate.

Examples of the methacrylate compound include monofunctional methacrylate compounds such as methyl methacrylate, n-butyl methacrylate, allyl methacrylate, glycidyl methacrylate, benzyl methacrylate, dimethylaminomethyl methacrylate, methoxypolyethylene glycol methacrylate, methoxytriethylene glycol methacrylate, hydroxyethyl methacrylate, phenoxyethyl methacrylate, and cyclohexyl methacrylate; and bifunctional methacrylate compounds such as polyethylene glycol dimethacrylate, polypropylene glycol dimethacrylate, 2,2-bis(4-methacryloxypolyethoxyphenyl)propane, and tetraethylene glycol dimethacrylate.

Examples of the styrene compound include styrene, p-methylstyrene, p-methoxystyrene, β-methylstyrene, p-methyl-β-methyl styrene, ca-methyl styrene, and p-methoxy-β-methyl styrene.

Examples of the vinylnaphthalene compound include 1-vinylnaphthalene, methyl-1-vinylnaphthalene, 3-methyl-1-vinylnaphthalene, 4-methyl-1-vinylnaphthalene, and 4-methoxy-1-vinylnaphthalene.

Examples of the N-vinyl heterocyclic compound include N-vinylcarbazole, N-vinylpyrrolidone, N-vinylethylacetamide, N-vinylpyrrole, N-vinylphenothiazine, N-vinylacetanilide, N-vinylethylacetamide, N-vinylsuccinimide, N-vinylphthalimide, N-vinylcaprolactam, and N-vinylimidazole.

Other examples of the polymerizable compound include allyl glycidyl ether, diallyl phthalate, triallyl trimellitate, and N-vinylamide such as N-vinylformamide.

Of these polymerizable compounds, the bi- or lower functional polymerizable compound is preferably at least one selected from the group consisting of 1,6-hexanediol diacrylate (HDDA), 1,9-nonanediol diacrylate (NDDA), 1,10-decanediol diacrylate (DDDA), 3-methylpentadiol diacrylate (3MPDDA), neopentyl glycol diacrylate, tricyclodecanedimethanol diacrylate, diethylene glycol diacrylate, tetraethylene glycol diacrylate, dipropylene glycol diacrylate, tripropylene glycol diacrylate (TPGDA), cyclohexanonedimethanol diacrylate, alkoxylated hexanediol diacrylate, polyethylene glycol diacrylate, and polypropylene glycol diacrylate.

The tri- or higher functional polymerizable compound is preferably at least one selected from the group consisting of trimethylolpropane triacrylate, pentaerythritol triacrylate, dipentaerythritol tetraacrylate, ditrimethylolpropane tetraacrylate, dipentaerythritol pentaacrylate, dipentaerythritol hexaacrylate, ethoxylated trimethylolpropane triacrylate, propoxylated trimethylolpropane triacrylate, caprolactone-modified trimethylolpropane triacrylate, pentaerythritol tetraacrylate, pentaerythritolethoxy tetraacrylate, glycerolpropoxy triacrylate, ethoxylated dipentaerythritol hexaacrylate, caprolactam-modified dipentaerythritol hexaacrylate, propoxylated glycerol triacrylate, ethoxylated trimethylolpropane triacrylate, and propoxylated trimethylolpropane triacrylate.

The combination of the bi- or lower functional polymerizable compound and the tri- or higher functional polymerizable compound is, for example, the combination of a bifunctional acrylate compound and a trifunctional acrylate compound, the combination of a bifunctional acrylate compound and a pentafunctional acrylate compound, or the combination of a monofunctional acrylate compound and a tetrafunctional acrylate compound.

The polymerizable compound is preferably
a monomer having a cyclic structure;
more preferably the above-described preferred compound group of bi- or higher functional cyclic polymerizable compounds, cyclohexyl acrylate, tetrahydrofurfuryl acrylate, benzyl acrylate, isobornyl acrylate, dicyclopentenyl acrylate, dicyclopentenyloxyethyl acrylate, dicyclopentanyl acrylate, ethoxylated isocyanurate triacrylate, or ε-caprolactone-modified tris-(2-acryloxyethyl) isocyanurate;
still more preferably the above-described preferred compound group of bi- or higher functional cyclic polymerizable compounds, dicyclopentenyl acrylate, dicyclopentenyloxyethyl acrylate, or dicyclopentanyl acrylate; or
particularly preferably the above-described preferred compound group of bi- or higher functional cyclic polymerizable compounds.

In addition to the above-described polymerizable compounds, there are other usable examples such as commercially available products described in, for example, "Crosslinking agent handbook", edited by Shinzo YAMASHITA (1981, TAISEISHA LTD.); "UV/EB curing handbook (raw material)", edited by Kiyomi KATO (1985, Kobunshi Kankokai); "Applications and markets of UV/EB curing techniques", edited by RadTech Japan, p. 79 (1989, CMC Publishing Co., Ltd.); and "Polyester resin handbook", written by Eiichiro TAKIYAMA (1988, THE NIKKAN KOGYO SHIMBUN, LTD.); and polymerizable and cross-linkable monomers publicly known in industry.

There are also polymerizable compounds that are photocurable polymerizable monomers used for photopolymerizable compositions and described in patent publications such as JP1995-159983A (JP-H7-159983A), JP1995-31399B (JP-H7-31399B), JP1996-224982A (JP-H8-224982A), JP1998-863A (JP-H10-863A), JP1997-134011A (JP-H9-134011A), and JP2004-514014A. These compounds are also applicable as polymerizable compounds that can be included in the specified particles.

The polymerizable compound may be a commercially available product on the market.

Examples of the commercially available product of the polymerizable compound include AH-600 (bifunctional), AT-600 (bifunctional), UA-306H (hexafunctional), UA-306T (hexafunctional), UA-306I (hexafunctional), UA-510H (decafunctional), UF-8001G (bifunctional), DAUA-167 (bifunctional), LIGHT ACRYLATE NPA (bifunctional), LIGHT ACRYLATE 3EG-A (bifunctional) (all from Kyoeisha Chemical Co., Ltd.), SR339A (PEA, monofunctional), SR506 (IBOA, monofunctional), CD262 (bifunctional), SR238 (HDDA, bifunctional), SR341 (3MPDDA, bifunctional), SR508 (bifunctional), SR306H (bifunctional), CD560 (bifunctional), SR833S (bifunctional), SR444 (trifunctional), SR454 (trifunctional), SR492 (trifunctional), SR499 (trifunctional), CD501 (trifunctional), SR502 (trifunctional), SR9020 (trifunctional), CD9021 (trifunctional), SR9035 (trifunctional), SR494 (tetrafunctional), SR399E (pentafunctional) (all from Sartomer), A-NOD-N (NDDA, bifunctional), A-DOD-N(DDDA, bifunctional), A-200 (bifunctional), APG-400 (bifunctional), A-BPE-10 (bifunctional), A-BPE-20 (bifunctional), A-9300 (trifunctional), A-9300-1CL (trifunctional), A-TMPT (trifunctional), A-TMM-3L (trifunctional), A-TMMT (tetrafunctional), AD-TMP (tetrafunctional) (all from Shin Nakamura Chemical Co., Ltd.), UV-7510B (trifunctional) (The Nippon Synthetic Chemical Industry Co., Ltd.), KAYARAD DPCA-30 (hexafunctional), and KAYARAD DPEA-12 (hexafunctional) (all from Nippon Kayaku Co., Ltd.).

In addition, preferred examples of the polymerizable compound include commercially available products such as NPGPODA (neopentyl glycol propylene oxide adduct diacrylate), SR531, SR285, SR256 (all from Sartomer), A-DHP (dipentaerythritol hexaacrylate, Shin Nakamura Chemical Co., Ltd.), ARONIX (registered trademark) M-156 (TOAGOSEI CO., LTD.), V-CAP (BASF), and VISCOAT #192 (OSAKA ORGANIC CHEMICAL INDUSTRY LTD.).

Among these commercially available products, in particular, preferred are polymerizable compounds having a cyclic structure that are SR506, SR833S, A-9300, and A-9300-CL, particularly preferred is SR833S.

The specified particles including a polymerizable compound can be produced by, for example, mixing an oil-phase component including a specified polymer and a polymerizable compound, and an aqueous-phase component, and emulsifying the resultant mixture.

Photopolymerization Initiator

The specified particles preferably include at least one photopolymerization initiator.

When the specified particles include a photopolymerization initiator, the resultant image has higher sensitivity to an actinic energy ray, hence has higher hardness and higher adhesion to the substrate.

Specifically, when the specified particles include a photopolymerization initiator, each specified particle has both of a polymerizable group and a photopolymerization initiator. Thus, the polymerizable group and the photopolymerization initiator are in close proximity to each other, so that, compared with the cases of using existing photocurable compositions, the film has higher curing sensitivity (hereafter, also simply referred to as "sensitivity"). As a result, the resultant film has higher hardness and higher adhesion to the substrate.

When the specified particles include a photopolymerization initiator, photopolymerization initiators that have high sensitivity but have low dispersibility or low solubility in water and hence have been difficult to use become usable (for example, a photopolymerization initiator having a solubility of 1.0 mass % or less in water at 25° C.). As a result, photopolymerization initiators used can be selected with a higher degree of freedom, which results in an increase in the degree of freedom of selecting light sources used. This can provide higher curing sensitivity.

The above-described photopolymerization initiators that have high sensitivity but have low dispersibility or low solubility in water and hence have been difficult to use are, for example, specifically carbonyl compounds and acylphosphine oxide compounds described later, preferably acylphosphine oxide compounds.

In this way, in the ink according to the present disclosure, the specified particles are prepared so as to include a substance having a low solubility in water, so that the substance is contained in the ink according to the present disclosure, which is an aqueous composition. This is another advantage of the ink according to the present disclosure.

The ink according to the embodiment in which the specified particles include a photopolymerization initiator also has higher storage stability than existing photocurable compositions. The probable reason for this is that the photopolymerization initiator is included in the specified particles, to thereby suppress aggregation or sedimentation of the photopolymerization initiator.

The photopolymerization initiator that can be included in the specified particles may be appropriately selected from publicly known photopolymerization initiators.

The photopolymerization initiator is a compound that absorbs light (namely, an actinic energy ray) to generate a radical serving as a polymerization initiation species.

The photopolymerization initiator may be a publicly known compound. Preferred examples of the photopolymerization initiator include (a) carbonyl compounds such as aromatic ketones, (b) acylphosphine oxide compounds, (c) aromatic onium salt compounds, (d) organic peroxides, (e) thio compounds, (f) hexaarylbiimidazole compounds, (g) ketoxime ester compounds, (h) borate compounds, (i) azinium compounds, (j) metallocene compounds, (k) active ester compounds, (l) compounds having a carbon-halogen bond, and (m) alkylamine compounds.

As the photopolymerization initiator, the above-described compounds (a) to (m) may be used alone or in combination of two or more thereof.

Preferred examples of (a) carbonyl compounds, (b) acylphosphine oxide compounds, and (e) thio compounds include compounds having a benzophenone skeleton or a thioxanthone skeleton and described in "RADIATION CURING IN POLYMER SCIENCE AND TECHNOLOGY", J. P. FOUASSIER, J. F. RABEK (1993), pp. 77 to 117.

More preferred examples include α-thiobenzophenone compounds described in JP1972-6416B (JP-S47-6416B), benzoin ether compounds described in JP1972-3981B (JP-S47-3981B), α-substituted benzoin compounds described in JP1972-22326B (JP-S47-22326B), benzoin derivatives described in JP1972-23664B (JP-S47-23664B), aroyl phosphonate described in JP1982-30704A (JP-S57-30704A), dialkoxybenzophenone described in JP1985-26483B (JP-S60-26483B), benzoin ethers described in JP1985-26403B (JP-S60-26403B) and JP1987-81345A (JP-S62-81345A), α-aminobenzophenones described in JP1989-34242B (JP-H1-34242B), U.S. Pat. No. 4,318,791A, and EP0284561A1, p-di(dimethylaminobenzoyl)benzene described in JP1990-211452A (JP-H2-211452A), thio-substituted aromatic ketone described in JP1986-194062A (JP-S61-194062A), acylphosphine sulfide described in JP1990-9597B (JP-H2-9597B), acylphosphine described in JP1990-9596B (JP-H2-9596B), thioxanthones described in JP1988-61950B (JP-S63-61950B), and coumarins described in JP1984-42864B (JP-S59-42864B).

Also preferred are polymerization initiators described in JP2008-105379A and JP2009-114290A.

Examples of commercially available products of the photopolymerization initiator include IRGACURE (registered trademark) 184, 369, 500, 651, 819, 907, 1000, 1300, 1700, 1870, DAROCUR (registered trademark) 1173, 2959, 4265, ITX, LUCIRIN (registered trademark) TPO [all manufactured by BASF], ESACURE (registered trademark) KTO37, KTO46, KIP150, EDB [all manufactured by Lamberti S.p.A.], H-Nu (registered trademark) 470, 470X [all manufactured by Spectra Group Limited], OMNIPOL TX, 9210 [all manufactured by IGM Resins B.V.], and SPEEDCURE 7005, 7010, and 7040 [all manufactured by LAMB SON Limited].

Among these photopolymerization initiators, more preferred are (a) carbonyl compounds or (b) acylphosphine oxide compounds; specific examples include bis(2,4,6-trimethylbenzoyl)-phenylphosphine oxide (such as IRGACURE (registered trademark) 819, manufactured by BASF), 2-(dimethylamine)-1-(4-morpholinophenyl)-2-benzyl-1-butanone (such as IRGACURE (registered trademark) 369, manufactured by BASF), 2-methyl-1-(4-methylthiophenyl)-2-morpholinopropan-1-one (such as IRGACURE (registered trademark) 907, manufactured by BASF), 1-hydroxycyclohexyl-phenyl-ketone (such as IRGACURE (registered trademark) 184, manufactured by BASF), and 2,4,6-trimethylbenzoyl-diphenyl-phosphine oxide (such as DAROCUR (registered trademark) TPO and LUCIRIN (registered trademark) TPO (both manufactured by BASF)).

Of these, from the viewpoint of, for example, higher sensitivity and suitability for LED light, the photopolymerization initiator internally included is preferably the (b) acylphosphine oxide compound, more preferably a monoacylphosphine oxide compound (particularly preferably, 2,4,6-trimethylbenzoyl-diphenyl-phosphine oxide), or a bisacylphosphine oxide compound (particularly preferably, bis(2,4,6-trimethylbenzoyl)-phenylphosphine oxide).

The LED light preferably has a wavelength of 355 nm, 365 nm, 385 nm, 395 nm, or 405 nm.

Alternatively, from the viewpoint of suppression of migration, the photopolymerization initiator is preferably a polymeric photopolymerization initiator.

Examples of the polymeric photopolymerization initiator include the above-described Omnipol TX and 9210; and SPEEDCURE 7005, 7010, and 7040.

The specified particles including a photopolymerization initiator can be produced by, for example, mixing an oil-phase component including a specified chain polymer and a photopolymerization initiator, and an aqueous-phase component, and emulsifying the resultant mixture.

The photopolymerization initiator content relative to the solid-content amount of the specified particles is preferably 0.1 mass % to 25 mass %, more preferably 0.5 mass % to 20 mass %, still more preferably 1 mass % to 15 mass %.

Sensitizer

The specified particles may include at least one sensitizer.

When the specified particles include at least one photopolymerization initiator, the specified particles preferably include at least one sensitizer.

When the specified particles contain a sensitizer, decomposition of the photopolymerization initiator caused by irradiation with an actinic energy ray can be further promoted.

The sensitizer is a substance that absorbs a specific actinic energy ray to shift to an electroexcitation state. The sensitizer in the electroexcitation state comes into contact with the photopolymerization initiator to cause an effect such as electron transfer, energy transfer, or generation of heat. This promotes a chemical change of the photopolymerization initiator, specifically, for example, decomposition, or generation of a radical, acid, or base.

Examples of the sensitizer include benzophenone, thioxanthone, isopropylthioxanthone, anthraquinone, 3-acylcoumarin derivative, terphenyl, styryl ketone, 3-(aroylmethylene)thiazoline, camphorquinone, eosine, rhodamine, and erythrosine.

Other preferred examples of the sensitizer include compounds represented by General formula (i) in JP2010-24276A, and compounds represented by General formula (I) in JP1994-107718A (JP-H6-107718A).

Of these, from the viewpoint of suitability for LED light and reactivity to a photopolymerization initiator, the sensitizer is preferably at least one selected from the group consisting of thioxanthone, isopropylthioxanthone, and benzophenone, more preferably at least one selected from the group consisting of thioxanthone and isopropylthioxanthone, still more preferably isopropylthioxanthone.

When the specified particles include a sensitizer, such sensitizers may be included alone or in combination of two or more thereof.

When the specified particles include a sensitizer, the sensitizer content relative to the solid-content amount of the specified particles is preferably 0.1 mass % to 20 mass %, more preferably 0.2 mass % to 15 mass %, still more preferably 0.3 mass % to 10 mass %.

The specified particles including a photopolymerization initiator and a sensitizer can be produced by, for example, mixing an oil-phase component including a specified chain polymer, a photopolymerization initiator, and a sensitizer, and an aqueous-phase component, and emulsifying the resultant mixture.

In the ink according to the present disclosure, the solid-content amount of the specified particles relative to the solid-content amount of the ink is preferably 50 mass % or more, more preferably 60 mass % or more, still more preferably 70 mass % or more, still more preferably 80 mass % or more, still more preferably 85 mass % or more.

This provides higher dispersion stability and higher adhesion between the image and the substrate.

In the ink according to the present disclosure, the solid-content amount of the specified particles relative to the total amount of the ink is preferably 1 mass % to 50 mass %, more preferably 3 mass % to 40 mass %, still more preferably 5 mass % to 30 mass %.

When the solid-content amount of the specified particles relative to the total amount of the ink is 1 mass % or more, higher adhesion between the image and the substrate is provided.

When the solid-content amount of the specified particles relative to the total amount of the ink is 50 mass % or less, the ink has higher dispersion stability.

The volume-average dispersed-particle size of the specified particles is not particularly limited, but is, from the viewpoint of dispersion stability, preferably 0.01 µm to 10.0 µm, more preferably 0.01 µm to 5 µm, still more preferably 0.05 µm to 1 µm, still more preferably 0.05 µm to 0.5 µm, still more preferably 0.05 µm to 0.3 µm.

In this Specification, the "volume-average dispersed-particle size" means a value measured by a light scattering method. The measurement of the volume-average dispersed-particle size of the specified particles by the light scattering method is performed with, for example, LA-960 (HORIBA, Ltd.).

Water

The ink according to the present disclosure contains water.

The water serves as a disperse medium of the specified particles (dispersoid).

The water content of the ink according to the present disclosure is not particularly limited. The water content relative to the total amount of the ink is preferably 10 mass % to 99 mass %, more preferably 20 mass % to 95 mass %, still more preferably 30 mass % to 90 mass %, particularly preferably 50 mass % to 90 mass %.

Coloring Material

The ink according to the present disclosure may be an ink containing at least one coloring material (what is called "color ink"), or may be an ink not containing any coloring material (what is called "clear ink").

When the ink contains a coloring material, the coloring material is preferably contained outside of the specified particles (in other words, the specified particles do not include the coloring material).

The coloring material is not particularly limited, and can be freely selected from publicly known coloring materials such as pigments, water-soluble dyes, and disperse dyes. Of these, more preferably, pigments are included because of high weather resistance and high color reproducibility.

The pigments are not particularly limited, and may be appropriately selected in accordance with the purpose. Examples of the pigments include publicly known organic pigments and inorganic pigments. Other examples of the pigments include resin particles dyed with dyes, commercially available pigment dispersions, and surface-treated pigments (such as a pigment dispersed in a dispersion medium such as water, a liquid compound, or an insoluble resin, and a pigment surface-treated with, for example, a resin or a pigment derivative).

Examples of the organic pigments and inorganic pigments include yellow pigments, red pigments, magenta pigments, blue pigments, cyan pigments, green pigments, orange pigments, violet pigments, brown pigments, black pigments, and white pigments.

When a pigment is used as the coloring material, a pigment dispersing agent may be optionally used.

When a pigment is used as the coloring material, the pigment may be a self-dispersible pigment in which the surfaces of pigment particles have a hydrophilic group.

For the coloring materials and the pigment dispersing agent, reference may be appropriately made to Paragraphs 0180 to 0200 of JP2014-040529A and Paragraphs 0122 to 0129 of WO2016/052053A.

When the ink according to the present disclosure contains a coloring material, the coloring material content relative to the total amount of the ink is preferably 0.1 mass % to 20 mass %, more preferably 0.5 mass % to 10 mass %, particularly preferably 0.5 mass % to 5 mass %.

Other Components

The ink according to the present disclosure may contain, as needed, other components different from the above-described components.

Such other components may be included in the specified particles, or may not be included in the specified particles.

Organic Solvent

The ink according to the present disclosure may contain an organic solvent.

When the ink according to the present disclosure contains an organic solvent, higher adhesion between the image and the substrate can be provided.

When the ink according to the present disclosure contains an organic solvent, the organic solvent content relative to the total amount of the ink is preferably 0.1 mass % to 10 mass %, more preferably 0.1 mass % to 5 mass %.

Specific examples of the organic solvent are as follows:

alcohols (such as methanol, ethanol, propanol, isopropanol, butanol, isobutanol, secondary butanol, tertiary butanol, pentanol, hexanol, cyclohexanol, and benzyl alcohol), polyhydric alcohols (such as ethylene glycol, diethylene glycol, triethylene glycol, polyethylene glycol, propylene glycol, dipropylene glycol, polypropylene glycol, butylene glycol, hexanediol, pentanediol, glycerol, hexanetriol, thiodiglycol, and 2-methylpropanediol), polyhydric alcohol ethers (such as ethylene glycol monomethyl ether, ethylene glycol monoethyl ether, ethylene glycol monobutyl ether, diethylene glycol monoethyl ether, diethylene glycol monomethyl ether, diethylene glycol monobutyl ether, propylene glycol monomethyl ether, propylene glycol monobutyl ether, tripropylene glycol monomethyl ether, dipropylene glycol monomethyl ether, dipropylene glycol dimethyl ether, ethylene glycol monomethyl ether acetate, triethylene glycol monomethyl ether, triethylene glycol monoethyl ether, triethylene glycol monobutyl ether, ethylene glycol monophenyl ether, and propylene glycol monophenyl ether), amines (such as ethanolamine, diethanolamine, triethanolamine, N-methyldiethanolamine, N-ethyldiethanolamine, morpholine, N-ethylmorpholine, ethylenediamine, diethylenediamine, triethylenetetramine, tetraethylenepentamine, polyethyleneimine, pentamethyldiethylenetriamine, and tetramethylpropylenediamine), amides (such as formamide, N,N-dimethylformamide, and N,N-dimethylacetamide), heterocycles (such as 2-pyrrolidone, N-methyl-2-pyrrolidone, cyclohexylpyrrolidone, 2-oxazolidone, 1,3-dimethyl-2-imidazolidinone, and γ-butyrolactone), sulfoxides (such as dimethyl sulfoxide), sulfones (such as sulfolane), and others (such as urea, acetonitrile, and acetone).

Surfactant

The ink according to the present disclosure may contain at least one surfactant.

When the ink according to the present disclosure contains a surfactant, the ink exhibits higher wettability to the substrate.

Examples of the surfactant include higher fatty acid salt, alkyl sulfate, alkyl ester sulfate, alkyl sulfonate, alkylbenzene sulfonate, sulfosuccinate, naphthalenesulfonate, alkyl phosphate, polyoxyalkylene alkyl ether phosphate, polyoxyalkylene alkyl phenyl ether, polyoxyethylene polyoxypropylene glycol, glycerol ester, sorbitan ester, polyoxyethylene fatty acid amide, and amine oxide.

Of these, the surfactant is preferably at least one surfactant selected from the group consisting of alkyl sulfate, alkyl sulfonate, and alkylbenzene sulfonate, particularly preferably alkyl sulfate.

The surfactant is, from the viewpoint of dispersibility of the specified particles, preferably an alkyl sulfate having an alkyl chain length of 8 to 18, more preferably at least one selected from the group consisting of sodium dodecyl sulfate (SDS, alkyl chain length: 12) and sodium cetyl sulfate (SCS, alkyl chain length: 16).

In addition to the above-described surfactants, there are other surfactants including those described in JP1987-173463A (JP-S62-173463A) and JP1987-183457A (JP-S62-183457A). Examples of the other surfactants include nonionic surfactants such as polyoxyethylene alkyl ethers, polyoxyethylene alkylaryl ethers, acetylene glycols, polyoxyethylene/polyoxypropylene block copolymers, and siloxanes.

Other examples of the surfactant include fluoroorganic compounds.

The fluoroorganic compounds are preferably hydrophobic. The fluoroorganic compounds include fluorosurfactants, oily fluorocompounds (such as fluorinated oil), and solid fluorocompound resins (such as tetrafluoroethylene resin); examples include fluoroorganic compounds described in JP1982-9053B (JP-S57-9053B) (8th column to 17th column) and JP1987-135826A (JP-S62-135826A).

Incidentally, the ink according to the present disclosure, which contains the specified particles having high dispersion stability, may contain substantially no surfactants (for example, anionic surfactants).

Herein, "contain substantially no" means that the content relative to the total amount of the ink is less than 1 mass % (preferably less than 0.1 mass %).

The embodiment in which the ink contains substantially no anionic surfactant has an advantage of suppressing foaming of the ink, an advantage of providing an image having higher water resistance, and an advantage of suppressing post-formation blushing of an image due to bleed out, for example. In particular, in the case of using, for preparation of the ink, a pigment dispersion having an anionic dispersible group, there is also the following advantage: degradation of dispersibility of the pigment is suppressed, the degradation being caused because an anionic surfactant causes an increase in the ion concentration of the system to cause a decrease in the degree of electrolytic dissociation of the anionic pigment dispersing agent.

Ultraviolet Absorbent

The ink according to the present disclosure may contain an ultraviolet absorbent.

When the ink according to the present disclosure contains an ultraviolet absorbent, it provides an image having higher weather resistance, for example.

Examples of the ultraviolet absorbent include publicly known ultraviolet absorbents such as benzotriazole-based compounds, benzophenone-based compounds, triazine-based compounds, and benzoxazole-based compounds.

The ink according to the present disclosure may optionally contain, from the viewpoint of hardness of the image, adhesion between the image and the substrate, and control of ink ejection stability, outside of the specified particles, a polymerizable compound, a photopolymerization initiator, and a resin, for example.

These components preferably have water-solubility or water-dispersibility.

Herein, the "water-solubility" is a property in which such a component having been dried at 105° C. for 2 hours has a solubility of more than 1 g in 100 g of distilled water at 25° C.

The "water-dispersibility" is a property in which such a component is water-insoluble and is dispersed in water. This term "water-insoluble" is a property in which such a component having been dried at 105° C. for 2 hours has a solubility of 1 g or less in 100 g of distilled water at 25° C.

The phrase "ink contains a polymerizable compound outside of the specified particles" means that the ink contains a polymerizable compound not included in the specified particles. The same applies to a photopolymerization initiator, a water-soluble resin, a water-dispersible resin, or the like contained outside of the specified particles.

Examples of the polymerizable compound that can be contained outside of the specified particles include polymerizable compounds described in Paragraphs 0148 to 0156 of WO2016/052053A.

Examples of the polymerizable compound that can be contained outside of the specified particles include polymerizable compounds such as a compound having an ethylenically unsaturated group, acrylonitrile, styrene, unsaturated polyester, unsaturated polyether, unsaturated polyamide, and unsaturated urethane.

Of these, the polymerizable compound that can be contained outside of the specified particles is preferably a compound having an ethylenically unsaturated group, particularly preferably a compound having a (meth)acryloyl group.

From the viewpoint of water-solubility or water-dispersibility, the polymerizable compound that can be contained outside of the specified particles is preferably a compound having at least one selected from the group consisting of an amide structure, a polyethylene glycol structure, a polypropylene glycol structure, a carboxyl group, and a salt of a carboxy group.

From the viewpoint of water-solubility or water-dispersibility, the polymerizable compound that can be contained outside of the specified particles is, for example, preferably at least one selected from the group consisting of (meth)acrylic acid, sodium (meth)acrylate, potassium (meth)acrylate, N,N-dimethylacrylamide, N,N-diethylacrylamide, morpholineacrylamide, N-2-hydroxyethyl(meth)acrylamide, N-vinylpyrrolidone, N-vinylcaprolactam, 2-hydroxyethyl (meth)acrylate, 3-hydroxypropyl (meth)acrylate, 2-hydroxypropyl (meth)acrylate, glycerol monomethacrylate, N-[tris(3-acryloylaminopropyloxymethylene)methyl]acrylamide, diethylene glycol bis(3-acryloylaminopropyl) ether, polyethylene glycol di(meth)acrylate, polypropylene glycol di(meth)acrylate, compounds represented by General formula (a) to General formula (d) below, and ethoxylated trimethylolpropane triacrylate (such as SR9035 manufactured by Sartomer); more preferably, at least one selected from the group consisting of (meth)acrylic acid, N,N-dimethylacrylamide, N-2-hydroxyethyl(meth)acrylamide, 2-hydroxyethyl (meth)acrylate, glycerol monomethacrylate, N-[tris(3-acryloylaminopropyloxymethylene)methyl]acrylamide, diethylene glycol bis(3-acryloylaminopropyl) ether, polyethylene glycol di(meth)acrylate, polypropylene glycol di(meth)acrylate, compounds represented by General formula (a) to General formula (d) below, and ethoxylated trimethylolpropane triacrylate (such as SR9035 manufactured by Sartomer).

General formula (a)

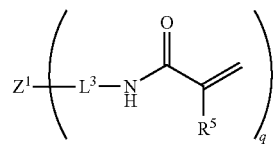

General formula (b)

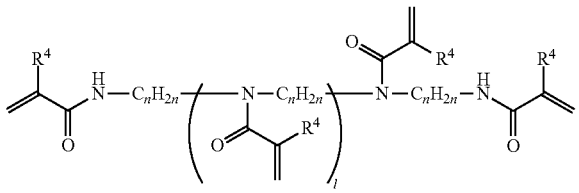

General formula (c)

General formula (d)

In General formula (a), the plurality of $R^1$'s each independently represent a hydrogen atom, an alkyl group, an aryl group, or a heterocyclic group; the plurality of $R^2$'s each independently represent a hydrogen atom or a methyl group; and the plurality of $L^1$'s each independently represent a single bond or a divalent linking group.

In General formula (b), the plurality of $R^3$'s each independently represent a hydrogen atom or a methyl group; the plurality of $L^2$'s each independently represent an alkylene group having 1 to 8 carbon atoms; the plurality of k's and p each independently represent 0 or 1; the plurality of m's each independently represent an integer of 0 to 8; however, at least one of k's or p is 1.

In General formula (c), the plurality of $R^4$'s each independently represent a hydrogen atom or a methyl group; the plurality of n's each independently represent an integer of 1 to 8; and l represents an integer of 0 or 1.

In General formula (d), $Z^1$ represents a residue of polyol in which q hydrogen atoms have been removed from the hydroxyl groups; q represents an integer of 3 to 6; the plurality of $R^5$'s each independently represent a hydrogen atom or a methyl group; and the plurality of $L^3$'s each independently represent an alkylene group having 1 to 8 carbon atoms.

Specific examples of compounds represented by General formula (a) to General formula (d) include compounds represented by the following AM-1 to AM-4.

AM-1

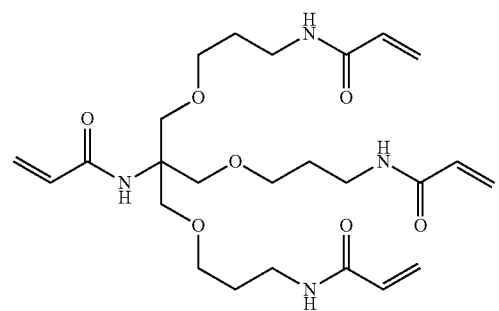

AM-2

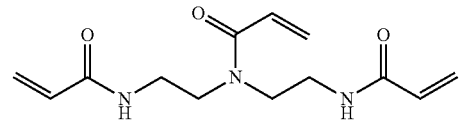

-continued

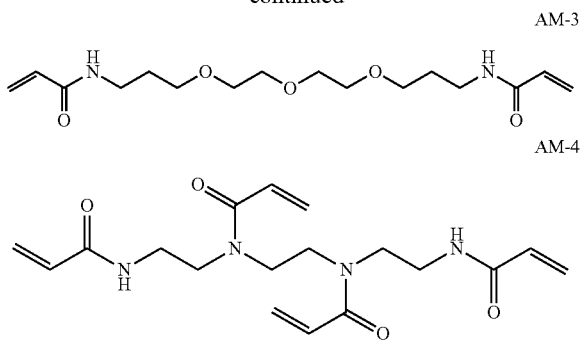

AM-1 to AM-4 above can be synthesized by the method described in JP5591858B.

Regarding the photopolymerization initiator and the resin that can be contained outside of the specified resin, reference can be appropriately made to Paragraphs 0139 to 0147 and 0157 in WO2016/052053A.

Preferred Properties of Ink

When the ink according to the present disclosure is set at 25° C. to 50° C., the ink preferably has a viscosity of 3 mPa·s to 15 mPa·s, more preferably 3 mPa·s to 13 mPa·s. In particular, when the ink according to the present disclosure is set at 25° C., the ink preferably has a viscosity of 50 mPa·s or less. When the viscosity of the ink satisfies such a range, higher ejection stability can be achieved.

Incidentally, the viscosity of the ink is a value measured with a viscometer (VISCOMETER TV-22, Toki Sangyo Co., Ltd.).

Specific Example 1 of Method for Producing Ink
(Production Method A)

The method for producing the ink according to the present disclosure is not particularly limited, but may be the following Production method A.

The Production method A has:

a step of mixing and emulsifying an oil-phase component and an aqueous-phase component including water, to form specified particles, wherein the oil-phase component is (i) an oil-phase component including an organic solvent, a specified polymer, a polymerization inhibitor A1, a polymerization inhibitor A2, and a polymerizable compound, (ii) an oil-phase component including an organic solvent, a tri- or higher functional isocyanate compound, a polymerization inhibitor A1, a polymerization inhibitor A2, and a polymerizable compound, (iii) an oil-phase component including an organic solvent, a specified polymer, a polymerization inhibitor B1, a polymerization inhibitor B2, and a polymerizable compound, or (iv) an oil-phase component including an organic solvent, a tri- or higher functional isocyanate compound, a polymerization inhibitor B1, a polymerization inhibitor B2, and a polymerizable compound.

This Production method A enables production of an ink for forming an image having high glossiness.

This Production method A facilitates production of an ink according to an embodiment in which the polymerization inhibitor A1 and the polymerization inhibitor A2, or the polymerization inhibitor B1 and the polymerization inhibitor B2 are included in the specified particles.

As in this Production method A, the process of adding polymerization inhibitors in the stage of performing emulsification to produce an aqueous dispersion of specified particles is hereafter also referred to as "internally adding" polymerization inhibitors to specified particles (or simply "internal addition").

In the step of forming the specified particles, the above-described oil-phase component and the aqueous-phase component are mixed and the resultant mixture is emulsified to thereby form the specified particles. The formed specified particles function as a dispersoid in the ink produced.

Water in the aqueous-phase component functions as a disperse medium in the ink produced.

Examples of the organic solvent included in the oil-phase component include ethyl acetate and methyl ethyl ketone.

The organic solvent is preferably at least partially removed during formation of the specified particles or after formation of the specified particles.

The oil-phase component may include, in addition to the above-described components, for example, a photopolymerization initiator, a sensitizer, a polymerizable-group-introducing compound (preferably, a compound having a polymerizable group and an active hydrogen group), a polymerizable-group-introduced isocyanate compound, and a hydrophilic-group-introduced isocyanate compound.

The aqueous-phase component is not particularly limited as long as it includes water, and may be water alone.

The aqueous-phase component may include, in addition to water, another component.

For example, the aqueous-phase component may include a hydrophilic-group-introducing compound (preferably a compound having a hydrophilic group and an active hydrogen group).

The aqueous-phase component may contain, as a neutralizer for an unneutralized anionic group (such as a carboxy group, a sulfo group, a phosphoric acid group, a phosphonic acid group, or a sulfuric acid group), a basic compound. This enables, during formation of the specified particles, formation of a neutralized anionic group (specifically, an anionic group in the form of salt such as a salt of a carboxy group, a salt of a sulfo group, a salt of a phosphoric acid group, a salt of a phosphonic acid group, or a salt of a sulfuric acid group).

Examples of the basic compound include inorganic bases such as sodium hydroxide and potassium hydroxide, and organic bases such as triethylamine. Of these, preferred basic compounds are inorganic bases such as sodium hydroxide and potassium hydroxide.

Examples of the salt of the anionic group in the form of salt include alkali metal salts such as sodium salts and potassium salts; and organic amine salts such as triethylamine salts. Of these, preferred salts of the anionic group in the form of salt are alkali metal salts such as sodium salts and potassium salts.

In the Production method A, the total amount of the oil-phase component and the aqueous-phase component except for the organic solvent and water corresponds to the solid-content amount of the specified particles in the ink produced.

Regarding preferred ranges of the amounts of components used for the Production method A, reference can be made to the above-described section "Ink". This reference is made such that, in the section "Ink", "content" and "the solid-content amount of the specified particles" are respectively replaced by "usage amount" and "total amount of the oil-phase component and the aqueous-phase component except for the organic solvent and water".

In the step of forming the specified particles, the method of mixing the oil-phase component and the aqueous-phase component is not particularly limited, but is, for example, mixing by stirring.

In the step of forming the specified particles, the method of performing emulsification is not particularly limited, but is, for example, emulsification using an emulsification device such as a homogenizer (for example, a dispersing device).

In the emulsification, the number of revolutions in the dispersing device is, for example, 5,000 rpm to 20,000 rpm, preferably 10,000 rpm to 15,000 rpm.

Herein, rpm is the abbreviation of round per minute.

In the emulsification, the time for revolutions is, for example, 1 minute to 120 minutes, preferably 3 minutes to 60 minutes, more preferably 3 minutes to 30 minutes, still more preferably 5 minutes to 15 minutes.

In the step of forming the specified particles, emulsification may be performed under heating.

The emulsification under heating enables more efficient formation of the specified particles.

In addition, the emulsification under heating facilitates, from the mixture, removal of at least a portion of the organic solvent in the oil-phase component.

The heating temperature in the case of emulsification under heating is preferably 35° C. to 70° C., more preferably 40° C. to 60° C.

The step of forming the specified particles may include an emulsification stage of emulsifying the mixture (at a temperature of less than 35° C., for example), and a heating stage of heating (at a temperature of 35° C. or more, for example) the emulsion obtained by the emulsification stage.

Such an embodiment including the emulsification stage and the heating stage enables, particularly in the heating stage, more efficient formation of the specified particles.

In addition, the embodiment including the emulsification stage and the heating stage facilitates, particularly in the heating stage, removal, from the mixture, at least a portion of the organic solvent in the oil-phase component.

The heating temperature in the heating stage is preferably 35° C. to 70° C., more preferably 40° C. to 60° C.

In the heating stage, the heating time is preferably 6 hours to 50 hours, more preferably 12 hours to 40 hours, still more preferably 15 hours to 35 hours.

The Production method A may have, in addition to the step of forming the specified particles, another step as needed.

The other step may be a step of adding other components (such as a pigment) after the step of forming the specified particles.

The other components (such as a pigment) added are the same as the above-described other components that can be contained in the ink.

Specific Example 2 of Method for Producing Ink
(Production Method B)

Another method for producing the ink according to the present disclosure may be the following Production method B.

The Production method B has:
a step of mixing and emulsifying (i) an oil-phase component including an organic solvent, a specified polymer, and a polymerizable compound, or (ii) an oil-phase component including an organic solvent, a tri- or higher functional isocyanate compound, and a polymerizable compound, and an aqueous-phase component including water, to obtain an aqueous dispersion including specified particles, and a step of adding, to the obtained aqueous dispersion, a polymerization inhibitor A1 and a polymerization inhibitor A2, or a polymerization inhibitor B1 and a polymerization inhibitor B2.

In the addition step of the Production method B, in addition to the polymerization inhibitor A1 and the polymerization inhibitor A2, or the polymerization inhibitor B1 and the polymerization inhibitor B2, other components (such as a pigment) may be added.

This Production method B also enables production of an ink for forming an image having high glossiness.

This Production method B facilitates production of an ink according to an embodiment in which the polymerization inhibitor A1 and the polymerization inhibitor A2, or the polymerization inhibitor B1 and the polymerization inhibitor B2 are not included in the specified particles.

In the Production method B, the components that can be included in the oil-phase component and the aqueous-phase component are the same as the components that can be included in the oil-phase component and the aqueous-phase component in the Production method A.

The preferred conditions of the Production method B are also the same as the preferred conditions of the Production method A.

As in this Production method B, a process of, after production the aqueous dispersion of the specified particles, adding, to this aqueous dispersion of the specified particles, polymerization inhibitors is hereafter also referred to as "externally adding" polymerization inhibitors to the specified particles (or simply "external addition").

Image-Forming Method

An image-forming method according to the present disclosure has a step of applying, onto a substrate, the above-described ink according to the present disclosure (hereafter, also referred to as "application step"), and a step of curing the ink composition applied onto the substrate (hereafter, also referred to as "curing step").

The image-forming method according to the present disclosure may optionally have another step.

The image-forming method according to the present disclosure forms an image having high scratch resistance on the substrate.

Application Step

The application step is a step of applying the ink according to the present disclosure onto a substrate.

The mode of applying the ink onto the substrate may be any one of modes using publicly known processes such as a coating process, an immersion process, or an ink jet process. In particular, the ink jet process is preferred because it enables formation of films (such as images) on various substrates (including recording media).

The substrate is not particularly limited and may be appropriately selected from, for example, publicly known substrates provided as support bodies and recording media.

Examples of the substrate include paper, paper laminated with plastic (such as polyethylene, polypropylene, or polystyrene), metal plates (plates of metals such as aluminum, zinc, or copper), plastic films [films of, for example, polyvinyl chloride (PVC: Polyvinyl Chloride) resin, cellulose diacetate, cellulose triacetate, cellulose propionate, cellulose butyrate, cellulose acetate butyrate, cellulose nitrate, polyethylene terephthalate (PET: Polyethylene Terephthalate), polyethylene (PE: Polyethylene), polystyrene (PS: Polystyrene), polypropylene (PP: Polypropylene), polycarbonate (PC: Polycarbonate), polyvinyl acetal, or acrylic resin], paper laminated with or vapor-deposition-coated with the foregoing metals, and plastic films laminated with or vapor-deposition-coated with the foregoing metals.

Other examples of the substrate include textile substrates.

Examples of the raw materials of the textile substrates include natural fibers such as cotton, silk, hemp, and wool; chemical fibers such as viscose rayon and lyocell; synthetic fibers such as polyester, polyamide, and acrylic; and mixtures of at least two species selected from the group consisting of natural fibers, chemical fibers, and synthetic fibers. The textile substrates may be textile substrates described in Paragraphs 0039 to 0042 of WO2015/158592A.

Preferred examples of the substrate include plastic substrates such as polyvinyl chloride (PVC) substrates, polystyrene (PS) substrates, polycarbonate (PC) substrates, polyethylene terephthalate (PET) substrates, polypropylene (PP) substrates, and acrylic resin substrates.

The application of the ink by an ink jet process can be performed with a publicly known ink jet recording apparatus.

The ink jet recording apparatus is not particularly limited, and a publicly known ink jet recording apparatus that provides a target resolution can be freely selected and used.

Such an ink jet recording apparatus is, for example, an apparatus including an ink supply device, a temperature sensor, and heating means.

The ink supply device includes, for example, a source tank including the ink according to the present disclosure, supply pipes, an ink supply tank disposed immediately upstream of an ink jet head, a filter, and a piezo ink jet head. The piezo ink jet head may be operated so as to eject multisize dots of preferably 1 pl to 100 pl, more preferably 8 pl to 30 pl, at a resolution of preferably 320 dpi (dot per inch)×320 dpi to 4000 dpi×4000 dpi (dot per inch), more preferably 400 dpi×400 dpi to 1600 dpi×1600 dpi, still more preferably 720 dpi×720 dpi. Incidentally, "dpi" represents the number of dots for 2.54 cm (1 inch).

Curing Step

The curing step is a curing step of curing the ink applied onto the substrate.

This curing step causes a crosslinking reaction (namely, polymerization) of the specified particles to proceed, to thereby provide higher adhesion between the image and the substrate and higher hardness of the image.

The curing step is preferably an irradiation step of irradiation with an actinic energy ray (light).

Irradiation Step

The irradiation step is a step of irradiating the ink applied onto the substrate, with an actinic energy ray.

In the irradiation step, the ink applied onto the substrate is irradiated with an actinic energy ray, so that a photocrosslinking reaction (namely, photopolymerization) of the specified particles in the ink proceeds, to thereby provide higher adhesion between the image and the substrate, and higher hardness of the image.

Examples of the actinic energy ray usable in the irradiation step include ultraviolet radiation (UV light), visible light, and an electronic beam. Of these, preferred is UV light.

The actinic energy ray (light) preferably has a peak wavelength of 200 nm to 405 nm, more preferably 220 nm to 390 nm, still more preferably 220 nm to 385 nm. The peak wavelength is also preferably 200 nm to 310 nm, also preferably 200 nm to 280 nm.

During the irradiation with an actinic energy ray (light), the illuminance at the exposed surface is, for example, 10 mW/cm$^2$ to 2000 mW/cm$^2$, preferably 20 mW/cm$^2$ to 1000 mW/cm$^2$.

During the irradiation with an actinic energy ray (light), the exposure energy is, for example, 10 mJ/cm$^2$ to 2000 mJ/cm$^2$, preferably 20 mJ/cm$^2$ to 1000 mJ/cm$^2$.

As sources for emitting an actinic energy ray (light), there are widely known sources such as a mercury lamp, a metal halide lamp, a UV fluorescent lamp, a gas laser, and a solid-state laser.

These light sources listed as examples may be replaced by semiconductor ultraviolet emission devices, which is industrially and environmentally advantageous.

Among semiconductor ultraviolet emission devices, LEDs (Light Emitting Diodes) and LDs (Laser Diodes), which are small, have long longevity and high efficiency, and are inexpensive, are considered as promising light sources.

Preferred light sources are a metal halide lamp, an ultrahigh pressure mercury lamp, a high pressure mercury lamp, a medium pressure mercury lamp, and a low pressure mercury lamp, an LED, and a blue-violet laser.

Of these, in the case of using a sensitizer and a photopolymerization initiator in combination, more preferred is an ultrahigh pressure mercury lamp that emits light at a wavelength of 365 nm, 405 nm, or 436 nm, a high pressure mercury lamp that emits light at a wavelength of 365 nm, 405 nm, or 436 nm, or an LED that emits light at a wavelength of 355 nm, 365 nm, 385 nm, 395 nm, or 405 nm; most preferred is an LED that emits light at a wavelength of 355 nm, 365 nm, 385 nm, 395 nm, or 405 nm.

In the irradiation step, the time for irradiating the ink applied onto the substrate with an actinic energy ray is, for example, 0.01 seconds to 120 seconds, preferably 0.1 seconds to 90 seconds.

As the irradiation conditions and the basic irradiation method, the irradiation conditions and the irradiation method disclosed in JP1985-132767A (JP-S60-132767A) can be similarly used.

A preferred mode of irradiation with an actinic energy ray is specifically a mode in which both sides of a head unit including an ink ejection device are equipped with light sources, and the head unit and the light sources are used to perform scanning by, what is called, the shuttle mode; or a mode of irradiation with an actinic energy ray using another light source without being driven.

The irradiation with an actinic energy ray is preferably performed after the lapse of a certain time (for example, 0.01 seconds to 120 seconds, preferably 0.01 seconds to 60 seconds) from landing and heat-drying of the ink.

Heat-Drying Step

The image-forming method may optionally further have a heat-drying step performed after the application step and before the curing step.

In the heat-drying step, the ink ejected onto the substrate is preferably treated with heating means to evaporate water and an organic solvent that is optionally used in combination, to fix the image.

The heating means is configured to dry at least water and an organic solvent that is optionally used in combination. The heating means is not particularly limited and, for example, heating using a heating drum, hot air, an infrared lamp, a heating oven, or a heating plate.

The heating temperature is preferably 40° C. or more, more preferably about 40° C. to about 150° C., still more preferably about 40° C. to about 80° C.

The heating time can be appropriately set in accordance with the composition of the ink and the printing speed.

The ink having been fixed by heating is optionally subjected to the irradiation step in which the ink is irradiated with an actinic energy ray to thereby be further fixed by light. As described above, in the irradiation step, fixing is preferably performed using UV light.

EXAMPLES

Hereinafter, the present invention will be specifically described with reference to Examples. However, the present invention is not limited to the following Examples. In the following description, "parts" mean parts by mass unless otherwise specified; "*" in chemical formulas represent bonding positions.

Example 1: External Addition

Hereinafter, Example 1 will be described in which polymerization inhibitors are externally added to microcapsules (hereafter, also referred to as "MC") serving as specified particles.
Preparation of Aqueous Dispersion of Microcapsules (MC)

The aqueous dispersion of microcapsules (MC) serving as specified particles was prepared in the following manner.
Preparation of Oil-Phase Component Ethyl acetate (55 parts), TAKENATE (registered trademark) D-110N (11 parts as the amount of trifunctional isocyanate compound present as solid content; hereafter, this solid content is also referred to as "D110") manufactured by Mitsui Chemicals, Inc., a polymerizable compound SR833S manufactured by Sartomer (hereafter, also referred to as "S833") (35 parts), a photopolymerization initiator "Omnipol TX" (1.8 parts) manufactured by IGM Resins B.V., a photopolymerization initiator "Genopol AB-2" (1.8 parts) manufactured by Rahn AG, and a photopolymerization initiator "Omnipol 9210" (3.5 parts) manufactured by IGM Resins B.V., were mixed and stirred for 15 minutes to obtain an oil-phase component.

TAKENATE D-110N is a 75 mass % ethyl acetate solution of an adduct of trimethylolpropane (TMP) and m-xylylene diisocyanate (XDI) ("D110" as a trifunctional isocyanate).

S833 is a bifunctional polymerizable compound (polymerizable monomer), specifically tricyclodecanedimethanol diacrylate.

The photopolymerization initiator "Omnipol TX" is multimerized thioxanthone.

The photopolymerization initiator "Genopol AB-2" is a polymerized 4-dimethylaminobenzoate.

The photopolymerization initiator "Omnipol 9210" is a mixture of polyethylene glycol di(P3-4-[4-(2-dimethylamino-2-benzyl)butyloylphenyl]piperazine)propionate and ethoxylated pentaerythritol tetraacrylate.
Preparation of Aqueous-Phase Component Distilled water (50 parts), lysine (Lysine; its structure is described below) (3.3 parts) serving as an anionic-group-introducing compound and manufactured by Tokyo Chemical Industry Co., Ltd., and sodium hydroxide serving as a neutralizer were mixed and stirred for 15 minutes to prepare an aqueous-phase component.

The amount of sodium hydroxide used as a neutralizer was adjusted such that MC to be produced would have carboxy groups having a neutralization degree of 90%.

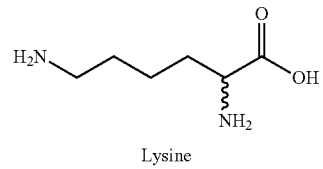

Lysine

The oil-phase component and the aqueous-phase component were mixed, and the resultant mixture was emulsified at room temperature with a homogenizer at 12000 rpm for 12 minutes, to obtain an emulsion.

The obtained emulsion was added to distilled water, and the resultant liquid was stirred at room temperature for 30 minutes. Subsequently, the stirred liquid was heated at 45° C. and stirred at 45° C. for 4 hours to drive off ethyl acetate from the liquid.

The liquid from which ethyl acetate had been driven off was heated at 50° C., and stirred for 24 hours while the liquid temperature was maintained at 50° C., to thereby form microcapsules (MC) in the liquid.

Subsequently, the liquid containing MC was diluted with distilled water such that the solid-content amount became 20 mass %, to thereby obtain an aqueous dispersion of MC.

The obtained MC are microcapsules including shells composed of a crosslinking polymer having urea bonds formed by a reaction between lysine and D110, and cores including a polymerizable compound and three photopolymerization initiators.
Preparation of Ink Components were mixed so as to satisfy the following composition, to prepare an ink.
Composition of Ink The above-described aqueous dispersion of MC: 50 parts Pigment dispersion liquid: 10 parts (Pro-jet Cyan APD1000 (manufactured by FUJIFILM Imaging Colorants, Inc.), pigment concentration: 14 mass %)

Fluorosurfactant: 0.3 parts (manufactured by E. I. du Pont de Nemours and Company, Capstone FS-31, solid content: 25 mass %)

Glycerol: 5 parts p-Methoxyphenol (MEHQ) serving as polymerization inhibitor B1: 0.01 parts 3,5-Di-tert-butyl-4-hydroxytoluene (BHT) serving as polymerization inhibitor B2: 0.5 parts Water: the balance of 100 parts in total
Evaluations The ink obtained above was evaluated in the following manner.

The results are described in Table 1.
Hardness of Cured Film (Pencil Hardness)

The ink stored at room temperature within 1 day from preparation was applied onto a substrate, to form, on the substrate, a coating film having a thickness of 12 μm.

The substrate employed was a polypropylene substrate CORREX, manufactured by DUROplastic Technologies.

The application was performed using a K Hand Coater, the No. 2 bar of the K Hand Coater, manufactured by RK PRINT COAT INSTRUMENTS LTD.

Subsequently, the coating film was dried at 60° C. for 3 minutes.

The dried coating film was irradiated with ultraviolet radiation (UV) to cure the coating film. Thus, a cured film was obtained.

The irradiation with ultraviolet radiation (UV) was performed with a laboratory UV mini conveyor apparatus CSOT (manufactured by GS Yuasa Power Supply Ltd.) including, as an exposure light source, an ozoneless metal halide lamp MAN250L, and set at a conveyor speed of 35 m/min and an exposure intensity of 1.0 W/cm². This irradiation with UV was performed at an exposure energy of 1000 mJ/cm².

The cured film was measured in terms of pencil hardness in accordance with JIS K5600-5-4 (1999).

The pencil employed for the measurement of pencil hardness was UNI (registered trademark) manufactured by Mitsubishi Pencil Co., Ltd.

Glossiness of Cured Film

The cured film formed as in the evaluation of pencil hardness was measured for glossiness using a glossmeter "GM-268Plus" manufactured by KONICA MINOLTA JAPAN, INC., at a measurement angle of 60°.

On the basis of measurement result, the glossiness of the cured film was evaluated in accordance with the following evaluation grades. In the following description, GU is the abbreviation of Gloss Unit.

Among the following evaluation grades, A represents the highest glossiness of a cured film.

Evaluation Grades of Glossiness
  A: Glossiness of 95 GU (Gloss Unit) or more
  B: Glossiness of 85 GU or more and less than 95
  C: Glossiness of 75 GU or more and less than 85
  D: Glossiness of 70 GU or more and less than 75
  E: Glossiness of less than 70 GU Ink Ejection Stability The ink stored at room temperature within 1 day from preparation was ejected through the head of an ink jet printer (manufactured by Roland DG Corporation, SP-300V) for 30 minutes, and then the ejection was terminated.

After 10 minutes elapsed from the termination of ejection, the ink was again ejected through the head onto the substrate to form a 5 cm×5 cm solid image.

Such images were visually inspected for missing dots due to, for example, nozzles turned into a non-ejection state, and ink ejection stability was evaluated in accordance with the following evaluation grades.

Among the following evaluation grades, A represents the highest ink ejection stability.

Evaluation Grades of Ejection Stability
  A: No missing dots due to, for example, nozzles turned into a non-ejection state were found and good images were obtained.
  B: A few missing dots due to, for example, nozzles turned into a non-ejection state were found, but they did not affect the practical use.
  C: Missing dots due to, for example, nozzles turned into a non-ejection state were found and the images were not practically usable.

Examples 2 to 14 and Comparative Examples 1 to 8: External Addition

The same procedures as in Example 1 were performed except that compounds used as polymerization inhibitors and the contents (mass %) of the compounds used as polymerization inhibitors relative to the ink total amount were changed as described in Table 1.

The results are described in Table 1.

Details of compounds in Table 1 (and Tables 2 and 3 described later) used as polymerization inhibitors (compound names, properties, and structures) are as follows. The compounds have solubilities in water at 25° C. as described in Table 1 (and Tables 2 and 3 described later).

HQ: hydroquinone, which is hydrophilic and aerobic, corresponds to the polymerization inhibitor A2, and also corresponds to the polymerization inhibitor B1.

MEHQ: p-methoxyphenol, which is hydrophilic and aerobic, corresponds to the polymerization inhibitor A2, and also corresponds to the polymerization inhibitor B1.

BQ: p-benzoquinone, which is hydrophilic and anaerobic, and corresponds to the polymerization inhibitor A1.

TBQ: 2-tert-butyl-1,4-benzoquinone, which is hydrophobic and anaerobic, and corresponds to the polymerization inhibitor A1.

BHT: 3,5-di-tert-butyl-4-hydroxytoluene, which is hydrophobic and aerobic, corresponds to the polymerization inhibitor A2, and also corresponds to the polymerization inhibitor B2.

4OH-TEMPO: 4-hydroxy-2,2,6,6-tetramethylpiperidine 1-oxyl, which is hydrophilic and anaerobic, and corresponds to the polymerization inhibitor A1.

Q-1301: N-nitrosophenylhydroxylamine aluminum salt, which is hydrophobic and anaerobic, and corresponds to the polymerization inhibitor A1.

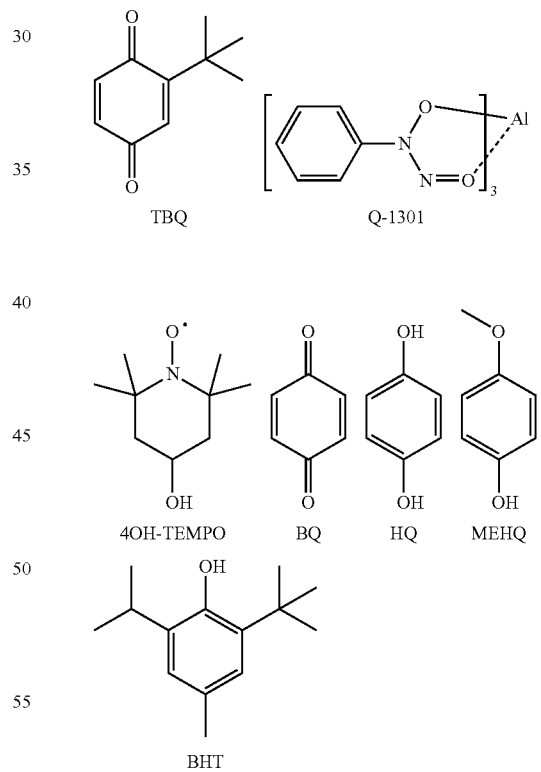

In each of the above-described Examples 1 to 14 and Comparative Examples 1 to 8, the aqueous dispersion of MC was used for measurement of the volume-average dispersed-particle size of MC.

As a result, in each of the Examples, MC were found to have a volume-average dispersed-particle size in a range of 0.15 µm to 0.25 µm.

TABLE 1

| | Particles | Polymerization inhibitor (A1 or B1) (external addition) | | | | Polymerization inhibitor (A2 or B2) (external addition) | |
|---|---|---|---|---|---|---|---|
| | | Compound | Type | Solubility in water at 25° C. (g/100 mL) | Content relative to total ink amount (mass %) | Compound | Type |
| Example 1 | MC | MEHQ | B1 | 4.0 | 0.01 | BHT | B2 |
| Example 2 | MC | TBQ | A1 | <1.0 | 0.01 | HQ | A2 |
| Example 3 | MC | TBQ | A1 | <1.0 | 0.01 | MEHQ | A2 |
| Example 4 | MC | TBQ | A1 | <1.0 | 0.01 | BHT | A2 |
| Example 5 | MC | Q-1301 | A1 | <1.0 | 0.01 | BHT | A2 |
| Example 6 | MC | 4OH-TEMPO | A1 | >10 | 0.01 | MEHQ | A2 |
| Example 7 | MC | 4OH-TEMPO | A1 | >10 | 0.01 | BHT | A2 |
| Example 8 | MC | BQ | A1 | 1.4 | 0.005 | BHT | A2 |
| Example 9 | MC | BQ | A1 | 1.4 | 0.008 | BHT | A2 |
| Example 10 | MC | BQ | A1 | 1.4 | 0.01 | BHT | A2 |
| Example 11 | MC | BQ | A1 | 1.4 | 0.08 | BHT | A2 |
| Example 12 | MC | BQ | A1 | 1.4 | 0.25 | BHT | A2 |
| Example 13 | MC | BQ | A1 | 1.4 | 0.01 | HQ | A2 |
| Example 14 | MC | BQ | A1 | 1.4 | 0.01 | MEHQ | A2 |
| Comparative Example 1 | MC | — | — | — | — | HQ | A2 |
| Comparative Example 2 | MC | BQ | A1 | 1.4 | 0.5 | — | — |
| Comparative Example 3 | MC | MEHQ | B1 | 4.0 | 0.5 | — | — |
| Comparative Example 4 | MC | — | — | — | — | BHT | A2 |
| Comparative Example 5 | MC | — | — | — | — | HQ | A2 |
| Comparative Example 6 | MC | TBQ | A1 | <1.0 | 0.5 | — | — |
| Comparative Example 7 | MC | HQ | B1 | 5.8 | 0.01 | MEHQ | B1 |
| Comparative Example 8 | MC | BQ | A1 | 1.4 | 0.01 | 4OH-TEMPO | A1 |

| | Polymerization inhibitor (A2 or B2) (external addition) | | A2/A1 or B2/B1 | Evaluations | | |
|---|---|---|---|---|---|---|
| | Solubility in water at 25° C. (g/100 mL) | Content relative to total ink amount (mass %) | | Glossiness | Pencil hardness | Ejection stability |
| Example 1 | <1.0 | 0.5 | 50 | D | H | B |
| Example 2 | 5.8 | 0.5 | 50 | C | H | B |
| Example 3 | 4.0 | 0.5 | 50 | C | H | B |
| Example 4 | <1.0 | 0.5 | 50 | B | H | B |
| Example 5 | <1.0 | 0.5 | 50 | B | H | B |
| Example 6 | 4.0 | 0.5 | 50 | B | H | B |
| Example 7 | <1.0 | 0.5 | 50 | A | H | A |
| Example 8 | <1.0 | 0.9 | 180 | B | H | A |
| Example 9 | <1.0 | 0.8 | 100 | A | H | A |
| Example 10 | <1.0 | 0.5 | 50 | A | H | A |
| Example 11 | <1.0 | 0.4 | 5 | A | F | A |
| Example 12 | <1.0 | 0.25 | 1 | A | HB | A |
| Example 13 | 5.8 | 0.5 | 50 | B | H | B |
| Example 14 | 4.0 | 0.5 | 50 | B | H | B |
| Comparative Example 1 | 5.8 | 0.5 | — | E | H | C |
| Comparative Example 2 | — | — | — | E | F | C |
| Comparative Example 3 | — | — | — | E | H | C |
| Comparative Example 4 | <1.0 | 0.5 | — | E | H | C |
| Comparative Example 5 | 5.8 | 0.5 | — | E | H | C |
| Comparative Example 6 | — | — | — | E | F | C |
| Comparative Example 7 | 4.0 | 0.5 | — | E | H | C |
| Comparative Example 8 | >10 | 0.5 | — | E | F | C |

Table 1 has demonstrated the following: Examples 1 to 14, which employ inks containing the combination of the polymerization inhibitor A1 that is at least one selected from the group consisting of quinone compounds, nitroso compounds, and N-oxyl compounds, and the polymerization inhibitor A2 that is at least one selected from the group consisting of phenol compounds, or the combination of the polymerization inhibitor B1 that is at least one selected from the group consisting of phenol compounds having a solubility of 1.0 g/100 mL or more in water at 25° C. and the polymerization inhibitor B2 that is at least one selected from the group consisting of phenol compounds having a solubility of less than 1.0 g/100 mL in water at 25° C. provide higher glossiness of images and higher ink ejection stability than Comparative Examples 1 to 8, which employ inks not containing such combinations.

Comparison among Example 8 and Examples 9 to 12 has revealed that an A2/A1 ratio (specifically, a content ratio of the polymerization inhibitor A2 with respect to the polymerization inhibitor A1 in terms of mass) of 100 or less (Examples 9 to 12) provides higher glossiness of the image.

Comparison among Examples 8 to 10 and Examples 11 and 12 has revealed that an A2/A1 ratio of 10 or more (Examples 8 to 10) provides higher hardness of the image.

Comparison among Example 1 and Examples 2 to 14 has revealed that an ink containing the combination of the polymerization inhibitor A1 and the polymerization inhibitor A2 (Examples 2 to 14) provides higher glossiness of the image.

Comparison among Examples 2 and 3 and Examples 4 to 7, 10, 13, and 14 has revealed that the polymerization inhibitor A1 having a solubility of 1.0 g/100 mL or more in water at 25° C. and/or the polymerization inhibitor A2 having a solubility of less than 1.0 g/100 mL in water at 25° C. (Examples 4 to 7, 10, 13, and 14) provides higher glossiness of the image.

Example 101: Internal Addition

Hereinafter, Example 101 will be described in which polymerization inhibitors are internally added to microcapsules (hereafter, also referred to as "MC") serving as specified particles.

Preparation of Aqueous Dispersion of Microcapsules (MC)

The aqueous dispersion of microcapsules (MC) serving as specified particles was prepared in the following manner.

Preparation of Oil-Phase Component

Ethyl acetate (55 parts), the above-described D-110N (11 parts as the amount of trifunctional isocyanate compound "D110" present as solid content), the above-described S833 serving as a polymerizable compound (35 parts), the above-described "Omnipol TX" serving as a photopolymerization initiator (1.8 parts), the above-described "Genopol AB-2" serving as a photopolymerization initiator (1.8 parts), the above-described "Omnipol 9210" serving as a photopolymerization initiator (3.5 parts), p-methoxyphenol (MEHQ) serving as the polymerization inhibitor B1 (0.05 parts), and 3,5-di-tert-butyl-4-hydroxytoluene (BHT) serving as the polymerization inhibitor B2 (2.5 parts), were mixed and stirred for 15 minutes to obtain an oil-phase component.

Preparation of Aqueous-Phase Component

Distilled water (50 parts), lysine (3.3 parts) serving as an anionic-group-introducing compound and manufactured by Tokyo Chemical Industry Co., Ltd., and sodium hydroxide serving as a neutralizer were mixed and stirred for 15 minutes, to prepare an aqueous-phase component.

The amount of sodium hydroxide used as a neutralizer was adjusted such that MC to be produced would have carboxy groups having a neutralization degree of 90%.

The oil-phase component and the aqueous-phase component were mixed, and the resultant mixture was emulsified at room temperature with a homogenizer at 12000 rpm for 12 minutes, to obtain an emulsion.

The obtained emulsion was added to distilled water, and the resultant liquid was stirred at room temperature for 30 minutes. Subsequently, the stirred liquid was heated at 45° C. and stirred at 45° C. for 4 hours to drive off ethyl acetate from the liquid.

The liquid from which ethyl acetate had been driven off was heated at 50° C., and stirred for 24 hours while the liquid temperature was maintained at 50° C., to thereby form microcapsules (MC) in the liquid.

Subsequently, the liquid containing MC was diluted with distilled water such that the solid-content amount became 20 mass %, to thereby obtain an aqueous dispersion of MC.

The obtained MC are microcapsules including shells composed of a crosslinking polymer having urea bonds formed by a reaction between lysine and D110, and cores including a polymerizable compound, three photopolymerization initiators, and two polymerization inhibitors.

Preparation of Ink

Components were mixed so as to satisfy the following composition, to prepare an ink.

Composition of Ink

The above-described aqueous dispersion of MC: 50 parts

Pigment dispersion liquid (Pro-jet Cyan APD1000 (manufactured by FUJIFILM Imaging Colorants, Inc.), pigment concentration: 14 mass %): 10 parts Fluorosurfactant (manufactured by E. I. du Pont de Nemours and Company, Capstone FS-31, solid content: 25 mass %): 0.3 parts Glycerol: 5 parts Water: the balance of 100 parts in total Evaluations The ink obtained above was evaluated as in Example 1. The results are described in Table 2.

Examples 102 to 113: Internal Addition

The same procedures as in Example 1 were performed except that species and amounts of components forming MC were changed as described in Table 2.

The results are described in Table 2.

In Table 2, the trifunctional isocyanate compound is described as Trifunctional NCO compound.

β-alanine (β-alanine) used in Example 113 has the following structure.

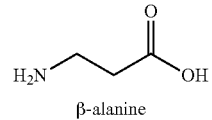

β-alanine

In each of the above-described Examples 101 to 113, the aqueous dispersion of MC was used for measurement of the volume-average dispersed-particle size of MC.

As a result, in each of the Examples, MC were found to have a volume-average dispersed-particle size in a range of 0.15 μm to 0.25 μm.

TABLE 2

| | Shells of MC (starting materials) | | | | Cores of MC | | | | | | | | |
|---|---|---|---|---|---|---|---|---|---|---|---|---|---|
| | Hydrophilic-group-introducing compound | | Trifunctional NCO compound | | Amount of polymerizable compound (parts) | Amount of photopolymerization initiator (parts) | Polymerization inhibitor (A1 or B1) (internal addition) | | | | | | |
| | Species | Amount (parts) | Species | Amount (parts) | | | Compound | Type | Solubility in water at 25° C. (g/100 mL) | Amount (parts) | Compound | Type | Solubility in water at 25° C. (g/100 mL) | Amount (parts) | A2/A1 or B2/B1 | Glossiness | Pencil hardness | Ejection stability |

| | Species | Amount (parts) | Species | Amount (parts) | Amount of polymerizable compound (parts) | Amount of photopolymerization initiator (parts) | Compound | Type | Solubility in water at 25° C. (g/100 mL) | Amount (parts) |
|---|---|---|---|---|---|---|---|---|---|---|
| Example 101 | Lysine | 3.3 | D110 | 11 | 35 | 7.1 | MEHQ | B1 | 4.0 | 0.05 |
| Example 102 | Lysine | 3.3 | D110 | 11 | 35 | 7.1 | TBQ | A1 | <1.0 | 0.05 |
| Example 103 | Lysine | 3.3 | D110 | 11 | 35 | 7.1 | TBQ | A1 | <1.0 | 0.05 |
| Example 104 | Lysine | 3.3 | D110 | 11 | 35 | 7.1 | TBQ | A1 | <1.0 | 0.05 |
| Example 105 | Lysine | 3.3 | D110 | 11 | 35 | 7.1 | Q-1301 | A1 | <1.0 | 0.05 |
| Example 106 | Lysine | 3.3 | D110 | 11 | 35 | 7.1 | 4OH-TEMPO | A1 | >10 | 0.05 |
| Example 107 | Lysine | 3.3 | D110 | 11 | 35 | 7.1 | 4OH-TEMPO | A1 | >10 | 0.025 |
| Example 108 | Lysine | 3.3 | D110 | 11 | 35 | 7.1 | BQ | A1 | 1.4 | 0.04 |
| Example 109 | Lysine | 3.3 | D110 | 11 | 35 | 7.1 | BQ | A1 | 1.4 | 0.05 |
| Example 110 | Lysine | 3.3 | D110 | 11 | 35 | 7.1 | BQ | A1 | 1.4 | 0.4 |
| Example 111 | Lysine | 3.3 | D110 | 11 | 35 | 7.1 | BQ | A1 | 1.4 | 1.25 |
| Example 112 | Lysine | 3.3 | D110 | 11 | 35 | 7.1 | BQ | A1 | 1.4 | 0.5 |
| Example 113 | β-Alanine | 3.3 | D110 | 11 | 35 | 7.1 | TBQ | A1 | <1.0 | 0.05 |

| | Compound | Type | Solubility in water at 25° C. (g/100 mL) | Amount (parts) | A2/A1 or B2/B1 | Glossiness | Pencil hardness | Ejection stability |
|---|---|---|---|---|---|---|---|---|
| Example 101 | BHT | B2 | <1.0 | 2.5 | 50 | D | H | B |
| Example 102 | HQ | A2 | 5.8 | 2.5 | 50 | C | H | B |
| Example 103 | MEHQ | A2 | 4.0 | 2.5 | 50 | C | H | B |
| Example 104 | BHT | A2 | <1.0 | 2.5 | 50 | B | H | B |
| Example 105 | BHT | A2 | <1.0 | 2.5 | 50 | B | H | B |
| Example 106 | MEHQ | A2 | 4.0 | 2.5 | 50 | B | H | B |
| Example 107 | BHT | A2 | <1.0 | 4.5 | 180 | B | H | B |
| Example 108 | BHT | A2 | <1.0 | 4 | 100 | A | H | A |
| Example 109 | BHT | A2 | <1.0 | 2.5 | 50 | A | H | A |
| Example 110 | BHT | A2 | <1.0 | 2 | 5 | A | H | A |
| Example 111 | BHT | A2 | <1.0 | 1.25 | 1 | A | F | A |
| Example 112 | BHT | A2 | <1.0 | 10 | 20 | A | HB | A |
| Example 113 | MEHQ | A2 | 4.0 | 2.5 | 50 | C | H | B |

As described in Table 2, Examples 101 to 113 in which polymerization inhibitors were internally added to particles (MC) provided the same results as in Examples 1 to 14 in which polymerization inhibitors were externally added to particles (MC).

Example 201: Internal Addition

Hereinafter, Example 201 will be described in which polymerization inhibitors are internally added to specified particles including a specified linear polymer.

Synthesis of Specified Chain Polymer

In accordance with the following reaction scheme, the following Polymer 1 was synthesized as a specified chain polymer.

The following Polymer 1 has a structure in which a structure unit derived from IPDI (isophorone diisocyanate) and other structure units are bonded together to form urethane bonds.

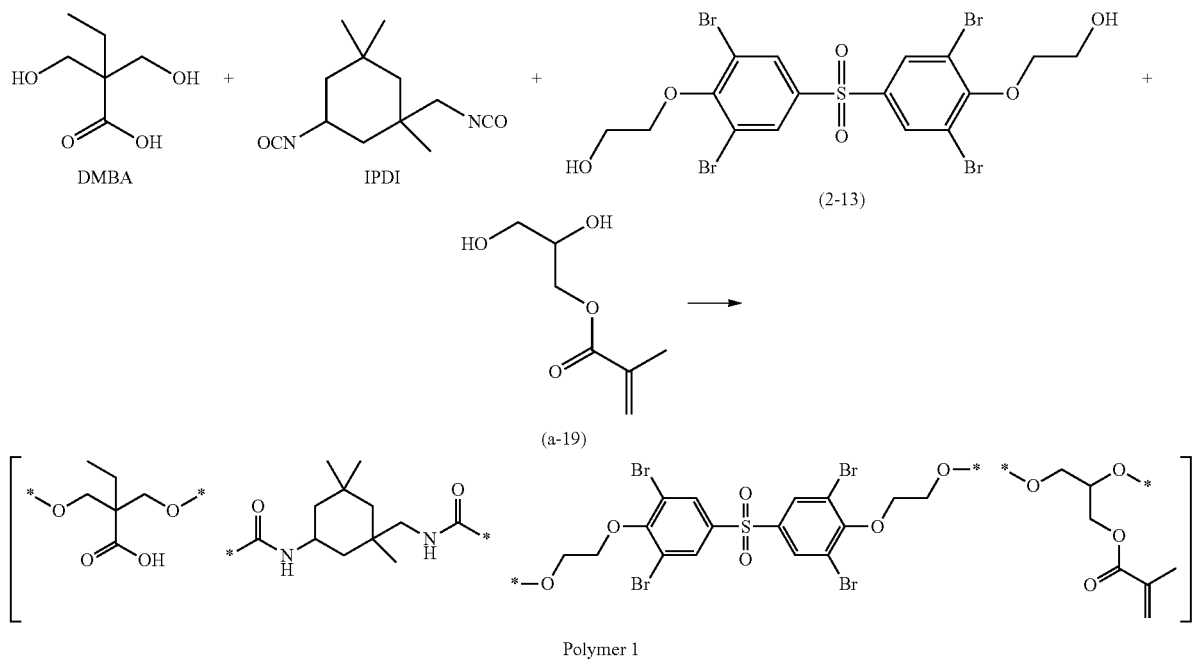

Polymer 1

To a three-neck flask, IPDI (47.8 g), DMBA (2,2-bis(hydroxymethyl)butyric acid) (9.1 g), Compound (2-13) (26.7 g), Compound (a-19) (16.4 g), and ethyl acetate (100 g) were charged and heated at 70° C. To this, 0.2 g of NEOSTANN U-600 (manufactured by Nitto Kasei Co., Ltd., inorganic bismuth catalyst; hereafter, also referred to as "U-600") was added, and stirred at 70° C. for 15 hours.

Subsequently, to this, isopropyl alcohol (70.0 g) and ethyl acetate (63.3 g) were added and stirred at 70° C. for 3 hours. After the stirring for 3 hours, the reaction solution was left to cool to room temperature, and then adjusted in terms of concentration using ethyl acetate, to provide a 30 mass % solution of Polymer 1 (the solvent was a mixed solution of ethyl acetate/isopropyl alcohol).

Polymer 1 was found to have a weight-average molecular weight (Mw) of 20000.

Preparation of Aqueous Dispersion
Preparation of Oil-Phase Component

Ethyl acetate,
the 30 mass % solution of Polymer 1 (51.5 parts as the amount of Polymer 1),
the above-described S833 serving as a polymerizable compound (19.5 parts),
a polymerizable compound SR399E (hereafter, also referred to as "S399") manufactured by Sartomer (19.5 parts),
the above-described "Omnipol TX" serving as a photopolymerization initiator (1.8 parts),
the above-described "Genopol AB-2" serving as a photopolymerization initiator (1.8 parts),
the above-described "Omnipol 9210" serving as a photopolymerization initiator (3.5 parts),
p-benzoquinone (BQ) serving as the polymerization inhibitor A1 (0.05 parts), and
3,5-di-tert-butyl-4-hydroxytoluene (BHT) serving as the polymerization inhibitor A2 (2.5 parts), were mixed and stirred for 15 minutes, to obtain 44 g of an oil-phase component having a solid content of 36 mass %.

S399 is a pentafunctional polymerizable compound (polymerizable monomer), specifically dipentaerythritol pentaacrylate.

Preparation of Aqueous-Phase Component

Distilled water (45 parts) and sodium hydroxide serving as a neutralizer were mixed and stirred for 15 minutes, to prepare an aqueous-phase component.

The amount of sodium hydroxide used as a neutralizer was adjusted such that the particles to be produced would have a neutralization degree of 90%.

The oil-phase component and the aqueous-phase component were mixed, and the resultant mixture was emulsified at room temperature with a homogenizer at 12000 rpm for 10 minutes, to obtain an emulsion. The obtained emulsion was added to distilled water (25 parts), and the resultant liquid was stirred at room temperature for 30 minutes. Subsequently, this liquid was heated at 50° C., and stirred at 50° C. for 3 hours, to drive off ethyl acetate from the liquid.

The liquid from which ethyl acetate had been driven off was further stirred at 50° C. for 24 hours, to form particles in the liquid.

Subsequently, the liquid containing particles was diluted with distilled water such that the solid-content amount became 20 mass %, to obtain an aqueous dispersion of the particles.

The formed particles are specifically particles including Polymer 1 serving as a specified linear polymer, the above-described two polymerizable compounds, the above-described three photopolymerization initiators, and the above-described two polymerization inhibitors.

The obtained aqueous dispersion of particles was used for measurement of the volume-average dispersed-particle size of the particles.

The particles were found to have a volume-average dispersed-particle size in a range of 0.15 μm to 0.25 μm.

Preparation of Ink

Components were mixed so as to satisfy the following composition to prepare an ink.

Composition of Ink

The above-described aqueous dispersion of particles: 50 parts

Pigment dispersion liquid (Pro-jet Cyan APD1000 (manufactured by FUJIFILM Imaging Colorants, Inc.), pigment concentration: 14 mass %): 10 parts Fluorosurfactant (manufactured by E. I. du Pont de Nemours and Company, Capstone FS-31, solid content: 25 mass %): 0.3 parts Glycerol: 5 parts Water: the balance of 100 parts in total Evaluations The ink obtained above was evaluated as in Example 1.

The results are described in Table 3.

TABLE 3

| | Specified chain polymer | | Polymerizable compound | | Polymerizable compound | | Amount of photopolymerization initiator | Polymerization inhibitor (A1 or B1) (internal addition) | | | |
|---|---|---|---|---|---|---|---|---|---|---|---|
| | | | | | | | | | | Solubility in water | |
| | Species | Amount (parts) | Species | Amount (parts) | Species | Amount (parts) | | Compound | Type | at 25° C. (g/100 mL) | Amount (parts) |
| Example 201 | Polymer 1 | 51.5 | S833 | 19.5 | S399 | 19.5 | 7.1 | BQ | A1 | 1.4 | 0.05 |

| | Total solid content of specified particles | | | | | | |
|---|---|---|---|---|---|---|---|
| | Polymerization inhibitor (A2 or B2) (internal addition) | | | | | Evaluations | |
| | | | Solubility in water | | A2/A1 | | |
| | Compound | Type | at 25° C. (g/100 mL) | Amount (parts) | or B2/B1 | Glossiness | Pencil hardness | Ejection stability |
| Example 201 | BHT | A2 | <1.0 | 2.5 | 50 | A | H | A |

As described in Table 3, in Example 201 in which the polymerization inhibitors were internally added to the specified particles including the specified chain polymer, the same results as in Example 10 were also obtained.

The entire contents disclosed by JP2017-074056 filed in the Japan Patent Office on Apr. 3, 2017 are incorporated herein by reference.

All the documents, patent applications, and technical standards mentioned in this Specification are incorporated herein by reference to the same extent as in the case where the documents, patent applications, and technical standards are each specifically and individually described as being incorporated herein by reference.

What is claimed is:

1. An ink composition comprising:
   water;
   particles that each include a polymer having at least one of a urethane bond or a urea bond, and each have a polymerizable group; and
   a combination of a polymerization inhibitor A1 that is at least one selected from the group consisting of quinone compounds, nitroso compounds, and N-oxyl compounds, and a polymerization inhibitor A2 that is at least one selected from the group consisting of phenol compounds, or a combination of a polymerization inhibitor B1 that is at least one selected from the group consisting of phenol compounds having a solubility of 1.0 g/100 mL or more in water at 25° C., and a polymerization inhibitor B2 that is at least one selected from the group consisting of phenol compounds having a solubility of less than 1.0 g/100 mL in water at 25° C.

2. The ink composition according to claim 1, wherein the polymerization inhibitor A1 is at least one selected from the group consisting of compounds (A1-1) below, compounds (A1-2) below, salts of the compounds (A1-2) below, and compounds (A1-3) below, wherein the polymerization inhibitor A2 is at least one selected from the group consisting of compounds (A2-1) below, wherein the polymerization inhibitor B1 is at least one selected from the group consisting of compounds (B1-1) below, and wherein the polymerization inhibitor B2 is at least one selected from the group consisting of compounds (B2-1) below,

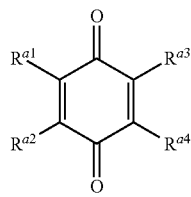
(A1-1)

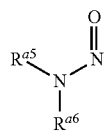
(A1-2)

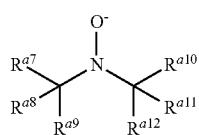
(A1-3)

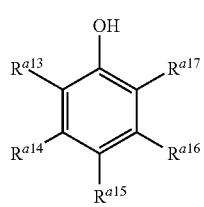
(A2-1)

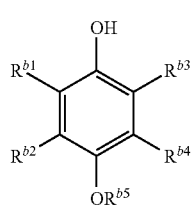
(B1-1)

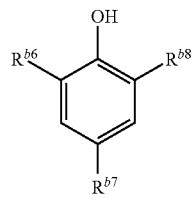
(B2-1)

wherein, in the compounds (A1-1), the compounds (A1-2), the compounds (A1-3), and the compounds (A2-1), $R^{a1}$ to $R^{a17}$ each independently represent a hydrogen atom, a chlorine atom, a hydroxy group, an alkyl group that has 1 to 12 carbon atoms and may have a cyclic structure, an alkoxy group that has 1 to 12 carbon atoms and may have a cyclic structure, or an aryl group having 6 to 12 carbon atoms, wherein, in the compounds (A1-1), $R^{a1}$ and $R^{a2}$ may be linked together with each other to form a ring, and $R^{a3}$ and $R^{a4}$ may be linked together with each other to form a ring, wherein, in the compounds (A1-2), $R^{a5}$ and $R^{a6}$ may be linked together with each other to form a ring, wherein, in the compounds (A1-3), $R^{a7}$, $R^{a8}$, or $R^{a9}$ may be linked together with $R^{a10}$, $R^{a11}$, or $R^{a12}$ each other to form a ring, wherein, in the compounds (A2-1), $R^{a13}$ and $R^{a14}$ may be linked together with each other to form a ring, $R^{a14}$ and $R^{a15}$ may be linked together with each other to form a ring, $R^{a15}$ and $R^{a16}$ may be linked together with each other to form a ring, and $R^{a16}$ and $R^{a17}$ may be linked together with each other to form a ring, wherein, in the compounds (B1-1) and the compounds (B2-1), $R^{b1}$ to $R^{b4}$ and $R^{b6}$ to $R^{b8}$ each independently represent a hydrogen atom, a hydroxy group, an alkyl group having 1 to 6 carbon atoms, an alkoxy group having 1 to 6 carbon atoms, or an aryl group having 6 to 12 carbon atoms, wherein, in the compounds (B1-1), $R^{b5}$ represents a hydrogen atom, an alkyl group having 1 to 6 carbon atoms, or an aryl group having 6 to 12 carbon atoms, and wherein, in the compounds (B1-1), $R^{b1}$ and $R^{b2}$ may be linked together with each other to form a ring, $R^{b3}$ and $R^{b4}$ may be linked together with each other to form a ring, $R^{b4}$ and $R^{b5}$ may be linked together with each other to form a ring, and $R^{b2}$ and $R^{b5}$ may be linked together with each other to form a ring.

3. The ink composition according to claim 1, wherein, in a case of comprising the combination of the polymerization inhibitor A1 and the polymerization inhibitor A2, a content ratio of the polymerization inhibitor A2 with respect to the polymerization inhibitor A1 is from 10 to 100 in terms of mass, or wherein, in a case of comprising the combination of the polymerization inhibitor B1 and the polymerization inhibitor B2, a content ratio of the polymerization inhibitor B2 with respect to the polymerization inhibitor B1 is from 10 to 100 in terms of mass.

4. The ink composition according to claim 1, comprising the combination of the polymerization inhibitor A1 and the polymerization inhibitor A2.

5. The ink composition according to claim 4, wherein the polymerization inhibitor A1 has a solubility of 1.0 g/100 mL or more in water at 25° C., and/or wherein the polymerization inhibitor A2 has a solubility of less than 1.0 g/100 mL in water at 25° C.

6. The ink composition according to claim 4,
wherein the polymerization inhibitor A1 is at least one selected from the group consisting of p-benzoquinone and 4-hydroxy-2,2,6,6-tetramethylpiperidine 1-oxyl, and
wherein the polymerization inhibitor A2 is at least one selected from the group consisting of hydroquinone, p-methoxyphenol, and 3,5-di-tert-butyl-4-hydroxytoluene.

7. A method for producing the ink composition according to claim 1, the method comprising:
mixing and emulsifying an oil-phase component and an aqueous-phase component including water, to form the particles,
wherein the oil-phase component is (i) an oil-phase component including an organic solvent, the polymer, the polymerization inhibitor A1, the polymerization inhibitor A2, and a polymerizable compound, (ii) an oil-phase component including an organic solvent, a tri- or higher functional isocyanate compound, the polymerization inhibitor A1, the polymerization inhibitor A2, and a polymerizable compound, (iii) an oil-phase component including an organic solvent, the polymer, the polymerization inhibitor B1, the polymerization inhibitor B2, and a polymerizable compound, or (iv) an oil-phase component including an organic solvent, a tri- or higher functional isocyanate compound, the polymerization inhibitor B1, the polymerization inhibitor B2, and a polymerizable compound.

8. An image-forming method comprising:
applying the ink composition according to claim 1 onto a substrate; and
curing the ink composition applied onto the substrate.

* * * * *